US011227030B2

(12) United States Patent
Simpson

(10) Patent No.: US 11,227,030 B2
(45) Date of Patent: Jan. 18, 2022

(54) MATRIX MULTIPLICATION ENGINE USING PIPELINING

(71) Applicant: Wave Computing, Inc., Santa Clara, CA (US)

(72) Inventor: David John Simpson, San Jose, CA (US)

(73) Assignee: Wave Computing, Inc., San Jose, CA (US)

( * ) Notice: Subject to any disclaimer, the term of this patent is extended or adjusted under 35 U.S.C. 154(b) by 114 days.

(21) Appl. No.: 16/835,812

(22) Filed: Mar. 31, 2020

(65) Prior Publication Data

US 2020/0311183 A1 Oct. 1, 2020

Related U.S. Application Data

(60) Provisional application No. 62/907,907, filed on Sep. 30, 2019, provisional application No. 62/898,770, filed on Sep. 11, 2019, provisional application No. 62/898,114, filed on Sep. 10, 2019, provisional application No. 62/894,002, filed on Aug. 30, 2019, provisional application No. 62/893,970, filed on Aug. 30, 2019, provisional application No. 62/887,722, filed on Aug. 16, 2019, provisional application No.
(Continued)

(51) Int. Cl.
*G06F 17/16* (2006.01)

(52) U.S. Cl.
CPC ................... *G06F 17/16* (2013.01)

(58) Field of Classification Search
CPC ....................................... G06F 17/16
USPC ....................................... 708/607
See application file for complete search history.

(56) References Cited

U.S. PATENT DOCUMENTS 5,142,631 A 8/1992 Murray et al.
6,134,605 A 10/2000 Hudson et al.
(Continued)

FOREIGN PATENT DOCUMENTS

JP 2005165961 A 12/2003
WO WO2009131569 A1 10/2009

OTHER PUBLICATIONS

International Search Report dated Feb. 6, 2015 for PCT/US2014/063591.
(Continued)

*Primary Examiner* — Tan V Mai
(74) *Attorney, Agent, or Firm* — Fernandez & Associates, LLP

(57) ABSTRACT

Techniques for data manipulation using a matrix multiplication engine using pipelining are disclosed. A first and a second matrix are obtained for matrix multiplication. A first matrix multiply-accumulate (MAC) unit is configured, where a first matrix element and a second matrix element are presented to the MAC unit on a first cycle. A second MAC unit is configured in pipelined fashion, where the first element of the first matrix and a second element of the second matrix are presented to the second MAC unit on a second cycle, and where a second element of the first matrix and the first element of the second matrix are presented to the first MAC unit on the second cycle. Additional MAC units are further configured within the processor in pipelined fashion. Multiply-accumulate operations are executed in pipelined fashion on each of n MAC units over additional k sets of m cycles.

23 Claims, 11 Drawing Sheets

Related U.S. Application Data

62/887,713, filed on Aug. 16, 2019, provisional application No. 62/882,175, filed on Aug. 2, 2019, provisional application No. 62/874,022, filed on Jul. 15, 2019, provisional application No. 62/857,925, filed on Jun. 6, 2019, provisional application No. 62/856,490, filed on Jun. 3, 2019, provisional application No. 62/850,059, filed on May 20, 2019, provisional application No. 62/827,333, filed on Apr. 1, 2019.

(56) References Cited

U.S. PATENT DOCUMENTS

| | | | |
|---|---|---|---|
| 6,363,470 | B1 | 3/2002 | Laurenti et al. |
| 7,817,655 | B1 | 10/2010 | Bennett et al. |
| 8,314,636 | B2 | 11/2012 | Hutton et al. |
| 8,341,469 | B2 | 12/2012 | Miyama et al. |
| 8,493,974 | B1 | 7/2013 | Nelson et al. |
| 10,467,183 | B2 | 11/2019 | Fleming |
| 10,853,448 | B1 * | 12/2020 | Shalev .................. G06F 17/16 |
| 2002/0167337 | A1 | 11/2002 | Chelcea et al. |
| 2007/0133399 | A1 | 6/2007 | Gangwal |
| 2008/0168303 | A1 | 7/2008 | Spear et al. |
| 2009/0070552 | A1 | 3/2009 | Kanstein et al. |
| 2009/0089605 | A1 | 4/2009 | Westwick et al. |
| 2010/0013517 | A1 | 1/2010 | Manohar et al. |
| 2010/0017774 | A1 | 1/2010 | Bachina et al. |
| 2010/0281448 | A1 | 11/2010 | He |
| 2010/0332755 | A1 | 12/2010 | Bu et al. |
| 2011/0199117 | A1 | 8/2011 | Hutchings et al. |
| 2012/0119781 | A1 | 5/2012 | Manohar et al. |
| 2012/0235839 | A1 | 9/2012 | Mazumdar et al. |
| 2012/0319730 | A1 | 12/2012 | Fitton et al. |
| 2013/0009666 | A1 | 1/2013 | Hutton et al. |
| 2013/0009667 | A1 | 1/2013 | Calhoun et al. |
| 2013/0043902 | A1 | 2/2013 | Rahim et al. |
| 2014/0075144 | A1 | 3/2014 | Sanders et al. |
| 2015/0123707 | A1 | 5/2015 | Nicol |
| 2015/0268963 | A1 | 9/2015 | Etsion et al. |
| 2017/0032285 | A1 | 2/2017 | Sharma et al. |
| 2017/0061279 | A1 | 3/2017 | Yang et al. |
| 2017/0140263 | A1 | 5/2017 | Kaiser et al. |
| 2019/0012295 | A1 * | 1/2019 | Yinger .................. G06F 7/5443 |
| 2020/0019847 | A1 * | 1/2020 | Krishnamurthy .... G06N 3/0481 |
| 2020/0081744 | A1 * | 3/2020 | Siegl ..................... G06N 3/063 |

OTHER PUBLICATIONS

Courbariaux, M., Bengio, Y., & David, J. P. (2014). Training deep neural networks with low precision multiplications. arXiv preprint arXiv:1412.7024.

Ioffe, S., & Szegedy, C. (2015) Batch normalization: Accelerating deep network training by reducing internal covariate shift. arXiv preprint arXiv:1502.03167.

Gupta, S., Agrawal, A., Gopalakrishnan, K., & Narayanan, P. (Jun. 2015). Deep learning with limited numerical precision. In International Conference on Machine Learning (pp. 1737-1746).

Lai, L., Suda, N., & Chandra, V. (2017). Deep convolutional neural network inference with floating-point weights and fixed-point activations. arXiv preprint arXiv:1703.03073.

* cited by examiner

MATRIX A
310

MATRIX B
320

MATRIX AB
330

$$\begin{bmatrix} a & b & c \\ d & e & f \\ g & h & i \\ j & k & l \end{bmatrix} \times \begin{bmatrix} m & n & o \\ p & q & r \\ s & t & u \end{bmatrix} = \begin{bmatrix} am+bp+cs & an+bq+ct & ao+br+cu \\ dm+ep+fs & dn+eq+ft & do+er+fu \\ gm+hp+is & gn+hq+it & go+hr+iu \\ jm+kp+ls & jn+kq+lt & jo+kr+lu \end{bmatrix}$$

FIG. 3

MATRIX MULTIPLICATION ENGINE USING PIPELINING

RELATED APPLICATIONS

This application claims the benefit of U.S. provisional patent applications "Matrix Multiplication Engine Using Pipelining" Ser. No. 62/827,333, filed Apr. 1, 2019, "Dispatch Engine with Queuing and Scheduling" Ser. No. 62/850,059, filed May 20, 2019, "Artificial Intelligence Processing Using Reconfiguration and Tensors" Ser. No. 62/856,490, filed Jun. 3, 2019, "Dispatch Engine with Interrupt Processing" Ser. No. 62/857,925, filed Jun. 6, 2019, "Data Flow Graph Computation Using Barriers with Dispatch Engines" Ser. No. 62/874,022, filed Jul. 15, 2019, "Integer Multiplication Engine Using Pipelining" Ser. No. 62/882,175, filed Aug. 2, 2019, "Multidimensional Address Generation for Direct Memory Access" Ser. No. 62/887,713, filed Aug. 16, 2019, "Processor Cluster Dispatch Engine with Dynamic Scheduling" Ser. No. 62/887,722, filed Aug. 16, 2019, "Data Flow Graph Computation Using Barriers" Ser. No. 62/893,970, filed Aug. 30, 2019, "Data Flow Graph Computation with Barrier Counters" Ser. No. 62/894,002, filed Aug. 30, 2019, "Distributed Dispatch Engine for Use with Heterogeneous Accelerators" Ser. No. 62/898,114, filed Sep. 10, 2019, "Data Flow Processing Dispatch Graph Compilation" Ser. No. 62/898,770, filed Sep. 11, 2019, and "Processor Cluster Address Generation" Ser. No. 62/907,907, filed Sep. 30, 2019.

Each of the foregoing applications is hereby incorporated by reference in its entirety.

FIELD OF ART

This application relates generally to data manipulation and more particularly to a matrix multiplication engine using pipelining.

BACKGROUND

The collection of public, personal, and other data has become so commonplace that its collection frequently goes unnoticed. The data is most typically collected from people as they interact with their electronic devices. The interactions can occur online, in public, or at home. An individual may be using her smartphone to peruse world news headlines, while another person is using his tablet to order pet food. Irrespective of the particular activity, metadata about the usage of their devices is collected. Data and metadata include details such as websites visited, products and services searched or viewed, and radio buttons clicked. All of this data is collected and analyzed, frequently for the purpose of monetization. The data analysis is used to push online content, products, or services that are predicted to match interests of the user. Emerging software analysis techniques and processor architectures are driving the collection of personal and other data at an accelerating rate. Businesspeople, researchers, and governments aggregate the collected data into datasets that are often referred to as "big data". The big data datasets can then be analyzed. The sizes of the big data datasets saturate the capabilities of the processors and analysis techniques traditionally utilized, rendering the analysis economically infeasible. The computational and processing requirements are further complicated by other data handling requirements such as the access, capture, maintenance, storage, transmission, and visualization of the data, among other tasks. Any one of these data handling requirements quickly swamps the capacities of the traditional systems. The collected data essentially would be of little or no value to any stakeholders without viable and scalable data analysis and handling techniques that are capable of meeting the requirements and applications of the data. Innovative computing architectures, plus software techniques, algorithms, functions, routines, and heuristics, are required. Dataset owners or those who have access to the datasets have business and research interests which motivate them to analyze the data. Common data analysis purposes include business analysis; disease or infection detection, tracking, and control; crime detection and prevention; meteorology; and complex scientific and engineering simulations; among many others. Advanced data analysis techniques are finding applications such as predictive analytics, which can be used to show consumers what they want, even before the consumers know that they want it. Further approaches include applying machine learning and deep learning techniques in support of the data analysis.

The introduction of advanced processing hardware and software learning techniques has been a boon to many computer science disciplines including machine learning. Machine learning supposes that a machine can "learn" on its own about a unique dataset, without the machine having to be explicitly coded or programmed by a user to handle that dataset. Machine learning can be performed on a network of processors such as a neural network. The neural network can process the big data datasets so that the neural network can learn about the data contained within the dataset. The greater the quantity of data, and the higher the quality of the data that is processed, the better the outcome of the machine learning. The processors on which the machine learning techniques can be executed are designed to efficiently handle the flow of data. These processors, which are based on data flow architectures, process data when valid data is presented to the processor. Data flow architectures enable simplifications to a processing system such as avoiding a need for a global system clock.

Computing architectures based on reconfigurable hardware are highly flexible and particularly well suited to processing large data sets, performing complex computations, and executing other computationally resource-intensive applications. Reconfigurable computing integrates the key advantages drawn from hardware and software techniques. A reconfigurable computing architecture can be "recoded" (reprogrammed) to suit a processing need. The recoding adapts or configures the high-performance hardware architecture, much like recoding software. A reconfigurable fabric hardware technique is directly applicable to reconfigurable computing. Reconfigurable fabrics may be arranged in topologies or configurations for the many applications that require high performance computing. Applications such as processing of big data; digital signal processing (DSP); machine learning based on neural networks, matrix, or tensor computations; vector operations; Boolean manipulations; and so on, can be implemented within a reconfigurable fabric. The reconfigurable fabric operates particularly well when the data includes specific types of data, large quantities of unstructured data, sample data, training data, and the like. The reconfigurable fabrics can be coded or scheduled to achieve these and other processing techniques, and to represent a variety of efficient computer architectures.

SUMMARY

Processing vast quantities of data such as unstructured data is widely pertinent to many computer science, research, and business applications. The data that is collected into large datasets, or "big data", is processed for many application areas that include artificial intelligence, trend analysis, business analytics, machine learning (including deep learning), medical research, law enforcement, public safety, and so on. Processors and processing techniques that were traditionally used for data analysis fail to meet the data handling requirements of the big data datasets. Designers and engineers of data analysis systems have attempted to meet the processing requirements by constructing or purchasing faster processors, designing custom integrated circuits (chips), developing application specific integrated circuits (ASICs), programming field programmable gate arrays (FPGAs), etc. These approaches are based on computer and chip architectures, such as Von Neumann architectures, which are focused on how control of the chip operations (control flow view) is performed. Alternatively, an architecture based on the flow of data (a data flow view) can be considered. In a data flow architecture, the execution of instructions, functions, subroutines, kernels, agents, apps, etc. is based on the presence or absence of valid data, where the valid data is made available to a processor. This data flow architecture approach is vastly better suited to the tasks of handling the large amounts of unstructured data, such as the data that is processed as part of the machine learning and deep learning applications. The data flow architecture simplifies and localizes control, thus obviating the need for centralized control of the processing. The control is simplified since no system clocks or centralized control signals are required. A data flow architecture can be implemented using a reconfigurable processor, chip, or a reconfigurable fabric.

Data manipulation is based on a matrix multiplication engine that uses pipelining. A processor-implemented method for data manipulation is disclosed comprising: obtaining a first matrix with dimensions m×k and a second matrix with dimensions k×n for matrix multiplication within a processor; configuring a first matrix multiply-accumulate (MAC) unit within the processor, wherein the first MAC unit accepts input elements of the first matrix and the second matrix, and wherein a first element of the first matrix and a first element of the second matrix are presented to the first MAC unit on a first cycle; configuring a second MAC unit within the processor in pipelined fashion, wherein the second MAC unit accepts input elements of the first matrix and the second matrix, wherein the first element of the first matrix and a second element of the second matrix are presented to the second MAC unit on a second cycle, and wherein a second element of the first matrix and the first element of the second matrix are presented to the first MAC unit on the second cycle; further configuring one or more additional MAC units within the processor in pipelined fashion; and executing multiply-accumulate operations in pipelined fashion. In embodiments, a total of n MAC units are configured, wherein an $i_{th}$ MAC unit accepts input elements of the first matrix and the second matrix. In embodiments, i is an integer in the range (3≤i≤n). In embodiments, the first element of the first matrix and an $i_{th}$ element of the second matrix are presented to the $i_{th}$ MAC unit on an $(i+2)_{th}$ cycle. In some embodiments, the multiply-accumulate operations are executed in pipelined fashion on each of the n MAC units for a total of (m×k) cycles. In embodiments, an additional m elements from the first matrix are presented over an additional k sets of m cycles. And in embodiments, results of the matrix multiplication are output to a storage element, and the outputting takes an additional (m×k) cycles. Operations other than multiply-accumulate operations, such as logical operations, mathematical operations, or tensor operations, can be performed.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 3 shows matrix multiplication.

DETAILED DESCRIPTION

Figure 1:
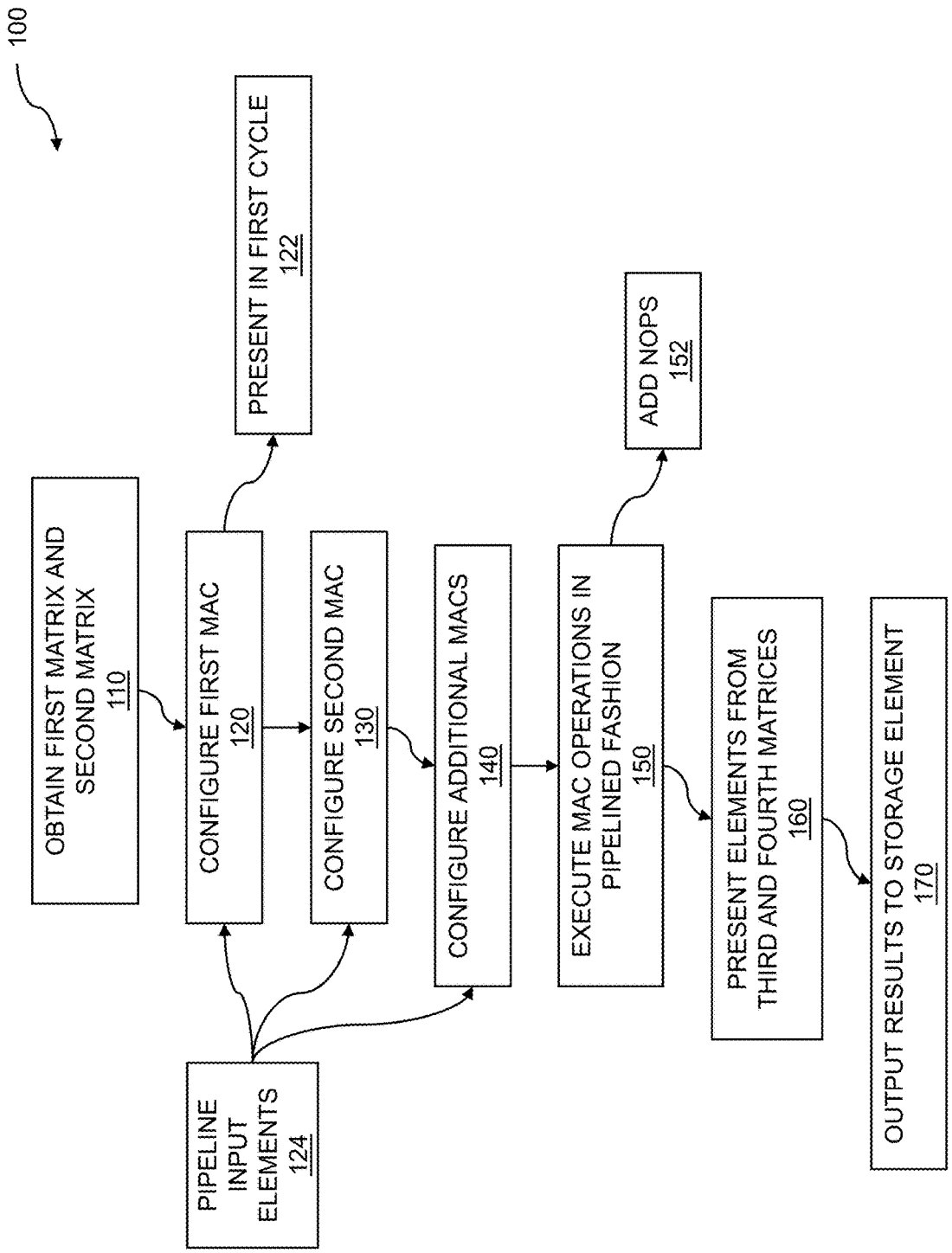
FIG. 1 is a flow diagram for a matrix multiplication engine using pipelining.

Techniques for data manipulation based on a matrix multiplication engine using pipelining are disclosed. The matrix multiplication engine can comprise one or more multiply-accumulate (MAC) units that can be configured within a processor. The processor can be coupled to a memory subsystem. The processor or the memory subsystem can comprise elements of a reconfigurable fabric, where the elements of the reconfigurable fabric can include processing elements, switching elements, or storage elements. The matrix multiplication engine can obtain matrices for matrix multiplication within the processor. The matrices that are obtained can include a first matrix with dimensions m×k and a second matrix with dimensions k×n. Multiply-accumulate units can be configured such as configuring a first matrix multiply-accumulate (MAC) unit within the processor, where the first MAC unit accepts input elements of the first matrix and the second matrix. A first element of the first matrix and a first element of the second matrix are presented to the first MAC unit on a first cycle. Other MAC configurations include configuring a second MAC unit within the processor in pipelined fashion. The second MAC unit accepts input elements of the first matrix and the second matrix. The first element of the first matrix and a second element of the second matrix are presented to the second MAC unit on a second cycle. A second element of the first matrix and the first element of the second matrix are presented to the first MAC unit on the second cycle. Further MAC configurations include further configuring one or more additional MAC units within the processor in pipelined fashion, such that a total of n MAC units are configured. An $i_{th}$ MAC unit accepts input elements of the first matrix and the second matrix, where i is an integer in the range (3≤i≤n). The first element of the first matrix and an $i_{th}$ element of the second matrix are presented to the $i_{th}$ MAC unit on an $(i+2)_{th}$ cycle. A multiply-accumulate operation can occur on each system. The MACs within the processor can execute multiply-accumulate operations on the elements of the matrices. The executing includes executing multiply-accumulate operations in pipelined fashion on each of then MAC units for a total of (m×k) cycles. An additional m elements from the first matrix are presented over an additional k sets of m cycles. The results of the executing MAC operations can be output. The outputting includes outputting the results of the matrix multiplication to a storage element, where the outputting takes an additional (m×k) cycles. As stated throughout, the storage element can be coupled to the processor. The storage element can include configured elements such as storage elements within the reconfigurable fabric. The disclosed techniques describe applications of the pipelined matrix multiplication engine. In embodiments, the processor and memory subsystem can be used to implement a data flow graph, where the data flow graph can implement machine learning.

Various types of processors can be implemented for the matrix multiplication engine using pipelining. The processor can include a CPU or GPU, programmable logic, application-specific integrated circuits (ASICs), arithmetic processors, logical processors, tensor processors, and the like. The processor can include clusters of elements within a reconfigurable computing environment. The memory subsystem can include small, fast memory and large, slow memory. The memory can include DMA memory, remote DMA memory, high performance memory, etc. While the disclosed techniques can address matrix calculations, the techniques can further be applied to processing of data using functions, algorithms, heuristics, apps, etc. The processing of data for data manipulation can be used to process large datasets. The large amounts of data, or "big data", saturate conventional, control-based computer hardware techniques such as Von Neumann techniques. The matrix calculations, functions, algorithms, heuristics, and so on, can be described instead by using data flow graphs, agents, networks, and so on. The data flow graphs, agents, networks, etc. can be partitioned or decomposed into smaller portions or operations such as kernels. The kernels can be allocated to processors such as CPUs or GPS, or to elements of the reconfigurable fabric. The allocating of elements within the reconfigurable fabric can include single processing elements, clusters of processing elements, a plurality of clusters of processing elements, coprocessors, etc. The reconfigurable fabric includes elements that can be configured or allocated as processing elements, switching elements, storage elements, and the like. The configuring of the elements within the reconfigurable fabric, and the operation of the configured elements, can be controlled by rotating circular buffers. The rotating circular buffers can be coded, programmed, or "scheduled" to control the elements of the reconfigurable array. The rotating circular buffers can be statically scheduled. The reconfigurable fabric supports data transfer, communications, and so on. The reconfigurable fabric further includes ports such as input ports, output ports, and input/output (bidirectional) ports, etc., which can be used to transfer data both into and out of the reconfigurable fabric. The data can include matrices, tensors, vectors, scalars, etc.

Multiple processing elements (PEs) within a reconfigurable fabric, mesh network, distributed network, or other suitable processing topology, obtain data, process data, store data, transfer data to other processing elements, and so on. The processing that is performed can be based on kernels, agents, functions, algorithms, heuristics, etc. The processing is based on sets of instructions that are allocated to a single PE, a cluster of PEs, a plurality of clusters of PEs, etc. The clusters of PEs can be distributed across the reconfigurable fabric. In order for processing of the data to be performed effectively and efficiently, the data must be routed from input ports of the reconfigurable fabric, through the reconfigurable fabric, to the clusters of PEs that require the data. A FIFO, register file, buffer, etc. can be used to provide an element stream to the processors, processing elements, and so on, that require the data. The element stream can include data, elements of a matrix or array, elements of a tensor, and so on.

A matrix multiplication engine using pipelining includes data manipulation. A first matrix with dimensions m×k and a second matrix with dimensions k×n are obtained for matrix multiplication within a processor. The processor can be coupled to a memory subsystem. The processor and the memory subsystem can include clusters of elements allocated within a reconfigurable fabric. The elements of the reconfigurable fabric can include processing elements, storage elements, or switching elements. A first matrix multiply-accumulate (MAC) unit is allocated within the processor, where the first MAC unit accepts input elements of the first matrix and the second matrix, where a first element of the first matrix and a first element of the second matrix are presented to the first MAC unit on a first cycle. A second MAC unit is configured within the processor in pipelined fashion where the second MAC unit accepts input elements of the first matrix and the second matrix. The first element of the first matrix and a second element of the second matrix are presented to the second MAC unit on a second cycle, and where a second element of the first matrix and the first element of the second matrix are presented to the first MAC unit on the second cycle. One or more additional MAC units are further configured within the processor in pipelined fashion, such that a total of n MAC units are configured. An $i_{th}$ MAC unit accepts input elements of the first matrix and the second matrix, where i is an integer in the range (3≤i≤n). The first element of the first matrix and an $i_{th}$ element of the second matrix are presented to the $i_{th}$ MAC unit on an $(i+2)_{th}$ cycle. Multiply-accumulate operations are executed in pipelined fashion on each of the n MAC units for a total of (m×k) cycles, where an additional m elements from the first matrix are presented over an additional k sets of m cycles. The results of the matrix multiplication are output to a storage element, where the outputting takes an additional number of (m×k) cycles.

FIG. 1 is a flow diagram for matrix multiplication engine using pipelining. A matrix multiplication engine can receive data such as input elements of a first matrix and input elements of a second matrix. The matrix multiplication engine can perform a matrix multiplication based on the received matrix elements. The input matrices can represent various types of data such as tensor data, multi-dimensional data, or other data such as image or signal data. The matrix multiplication can be based on calculating partial products, then adding the partial products to a running total or "accumulation" of partial products, to form a matrix multiplication result. Note that for a first matrix with dimensions m×k, and a second matrix with dimensions k×n, the result of the matrix multiplication will be a matrix with dimensions m×n. The matrix multiplication engine can be based on a plurality of multiply-accumulate (MAC) units. The MAC units can be configured within one or more processors, as described throughout. The matrix multiplication engine can be used to perform a variety of operations that include matrix multiplication such as linear algebra operations. The linear algebra operations are applicable to a variety of disciplines such as physics and engineering, applied mathematics, economics, statistics, and so on.

The flow 100 includes obtaining a first matrix with dimensions m×k and a second matrix with dimensions k×n for matrix multiplication within a processor 110. The matrices can include binary, integer, real, floating point, or other values. The matrices can include partitions or submatrices of larger matrices. The matrices can be obtained in various ways such as uploading by a user, reading from a file, downloading over a computer network, or the like. In embodiments, the input elements of the first matrix can include an 8×8 submatrix. The submatrix can include other dimensions such as 2×2, 4×4, and so on. In further embodiments, the input elements of the second matrix can include an 8×8 submatrix. An m×k matrix comprises m rows and k columns. A k×n matrix comprises k rows and n columns. In embodiments, the input elements of the first matrix can be taken from a row of the first matrix. For matrices obtained for subsequent matrix multiplication operations, such as a third matrix, the input elements of a third or other matrix can be taken from a row of the first matrix. In other embodiments, the input elements of the second matrix can be taken from a column of the second matrix. Similarly, the input elements of a fourth matrix can be taken from a column of the fourth matrix.

The flow 100 includes configuring a first matrix multiply-accumulate (MAC) 120 unit within the processor. The processor can include a general purpose processor such as a central processing unit (CPU), a specialized processor such as a graphics processing unit (GPU), a programmable chip such as a field programmable gate array (FPGA), an application specific chip such as an application specific integrated circuit (ASIC), and so on. In embodiments, the MAC can be configured within a reconfigurable component such as a reconfigurable fabric. A reconfigurable fabric can comprise elements such as processing elements, storage elements, or switching elements. The elements within the reconfigurable fabric can be organized into clusters. In embodiments, the first MAC unit can accept input elements of the first matrix and the second matrix. The input elements can include valid data. In other embodiments, a first element of the first matrix and a first element of the second matrix can be presented to the first MAC unit on a first cycle 122. The first cycle can include an operation cycle, a clock cycle, etc. Further embodiments include pipelining input elements 124 to the MAC units through two input registers.

The flow 100 includes configuring a second MAC unit within the processor in pipelined fashion 130. Configuring the second MAC in pipelined fashion can include establishing a "pipeline" of MACs such as the first MAC and the second MAC. In a pipeline, the first MAC and the second MAC can be presented with input data at substantially the same time. The pipeline can be used to accelerate various operations such as matrix multiplication operations by enabling multiple elements such as matrix elements to be provided to two or MACs at substantially the same time. A pipeline can be thought of as a computational analog of an assembly line. In a pipeline, units such as MAC units can be presented with elements and can operate on those elements. Results of the operations of a given MAC can be forwarded or provided to a subsequent MAC while the first MAC performs another operation. The subsequent MAC can perform an operation on the results of the prior MAC, etc. In embodiments, the second MAC unit accepts input elements of the first matrix and the second matrix. The first element of the first matrix and a second element of the second matrix are presented to the second MAC unit. The presenting of the first element of the first matrix and the second element of the second matrix can occur on a second cycle. The second element of the first matrix and the first element of the second matrix are presented to the first MAC unit on the second cycle. Thus, the first MAC and the second MAC can be presented with data during the same cycle.

The flow 100 includes further configuring one or more additional MAC units within the processor in pipelined fashion 140. In embodiments, the additional MAC units are configured such that a total of n MAC units are configured. The configuring the additional MAC units can be accomplished within the same processor as the first MAC or the second MAC, within one or more additional processors, within a reconfigurable fabric, etc. The additional MACs can accept input elements from matrices. In embodiments, an $i_{th}$ MAC unit accepts input elements of the first matrix and the second matrix. As discussed below, the MAC units can accept input elements from further matrices upon completion of performing an operation on the first matrix and the second matrix. In further embodiments, i is an integer in the range (3≤i≤n). The pipeline formed from the first MAC, the second MAC, and one or more additional MACs can have a depth of three or greater, up to a depth of n. In embodiments, each MAC unit can be configured to have an accumulator depth of m. A number of cycles can be required in order to present input elements from the first matrix and input elements from the second matrix. In embodiments, the first element of the first matrix and an $i_{th}$ element of the second matrix are presented to the $i_{th}$ MAC unit on an $(i+2)_{th}$ cycle.

The flow 100 includes executing multiply-accumulate operations in pipelined fashion 150 on each of the n MAC units for a total of (m×k) cycles. The executing multiply-accumulate operations can include calculating a partial product (multiply) and adding the partial product to a running sum (accumulate). The executing the MAC operations can include operations for matrix multiplication, as discussed throughout, or other operations including logical operations, various mathematical operations, and the like. Matrix multiplication can include calculating an inner product (sum of products) between the two matrices. In embodiments, each matrix multiply inner product takes k cycles to complete. The matrix multiplication operations can be performed to accomplish one or more tensor operations. The tensor calculation can include a tensor product, a tensor contraction, raising a tensor index, lowering a tensor index, and so on. A tensor can be represented by an array, a matrix, submatrices, etc. In embodiments, an additional m elements from the first matrix are presented over an additional k sets of m cycles. Note that the n MAC units can execute MAC operations substantially in parallel. In embodiments, performing n MAC operations in parallel can reduce the amount of time taken to perform the n MAC operations from an order of magnitude of $n^3$ to an order of magnitude of $n^2$. Subsequent to the multiplication of two matrices, other matrices can be multiplied by the matrix multiplication engine. Input elements from the additional matrices may not be immediately available for matrix multiplication. Further embodiments can include adding one or more idle or no operation (NOP) cycles 152 after the completion of a matrix multiply operation before starting a next matrix multiply operation. An appropriate number of NOP cycles can be selected. In embodiments, the number of idle or NOP cycles can be no less than (m×n)−(m×(k−1))−n. The adding the NOP cycles can be used to accomplish a variety of tasks relating to the pipeline. In embodiments, the adding idle or NOP cycles can facilitate pipeline draining.

The flow 100 further includes presenting a first element from a third matrix and a first element from a fourth matrix 160 to the first MAC unit after (m×k) cycles. The presenting the first element from the third matrix and the first element from the fourth matrix can occur subsequent to the matrix multiplication of the first matrix and the second matrix. The presenting elements of the third matrix and elements of the fourth matrix can be accomplished without requiring reconfiguration of the MAC units if certain conditions can be met. In embodiments, a second dimension of the fourth matrix can be the same as a second dimension of the second matrix. The first matrix, the second matrix, the third matrix, or the fourth matrix can represent a matrix, a partition of a matrix, a submatrix, a subsection of a matrix, and so on. In embodiments, the matrices can include subsections of an o-dimensional tensor, wherein o is greater than 2. The NOP cycles can be added until valid data is available to be presented to the MAC units. The valid data can include input elements of the additional matrices. In further embodiments, the idle or NOP cycles can be inserted when neither an input element of the first matrix nor an input element of the second matrix is valid during the same cycle.

The flow 100 further includes outputting the results of the matrix multiplication to a storage element 170, where the outputting takes an additional (m×k) cycles. The storage element can comprise a processor and memory subsystem. The processor and memory subsystem can be allocated as part of one or more clusters within a reconfigurable fabric to implement MAC units. As discussed previously, the processor and the memory subsystem can include one or more processors such as central processing units (CPUs), graphic processing units (GPUs), arithmetic processors, multiplication processors, reconfigurable processors such as array or parallel processors, reconfigurable integrated circuits or chips such as field programmable gate arrays (FPGAs), application-specific integrated circuits (ASICs), and so on. The memory subsystem can include various types of memory, where the memory can include fast memory, slow memory, and the like. In embodiments, the memory subsystem comprises DMA memory. The DMA memory can include remote DMA (RDMA) memory. In other embodiments, the memory subsystem comprises high performance memory (HPM). The high performance memory can be smaller and faster than the slower memory. In embodiments, the processor and memory subsystem can be allocated as part of one or more clusters within a reconfigurable fabric. The one or more clusters comprise elements that can be configured. In embodiments, each cluster of the one or more clusters within the reconfigurable fabric can include processing elements, switching elements, or storage elements. In order to configure the reconfigurable fabric, the clusters can be controlled by a code, a program, a schedule, and so on. In embodiments, each cluster of the one or more clusters within the reconfigurable fabric can be controlled by one or more circular buffers. A code, program, or schedule can be loaded into the one or more circular buffers. In embodiments, the one or more circular buffers are statically scheduled.

The processor and memory subsystem can be configured and used for a variety of computational purposes. The processor and memory subsystem can be configured to perform operations such as logic operations, mathematical operations, array or matrix operations, tensor operations, and so on. The operations that can be performed can be represented by graphs, networks, nets, and so on. In embodiments, the processor and memory subsystem is used to implement a data flow graph. A data flow graph can be represented by kernels, agents, codes, routines, procedures, apps, etc. In embodiments, the data flow graph implements machine learning. The machine learning can be used to analyze data such as matrices, and to adapt based on the data, where the adapting can increase accuracy, improve convergence of the computations, and the like. In embodiments, the machine learning utilizes one or more neural networks. Various neural network techniques can be used to implement the one or more neural networks. In embodiments, the techniques used to implement the one or more neural networks can include convolutional neural networks, recurrent neural networks, and so on. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
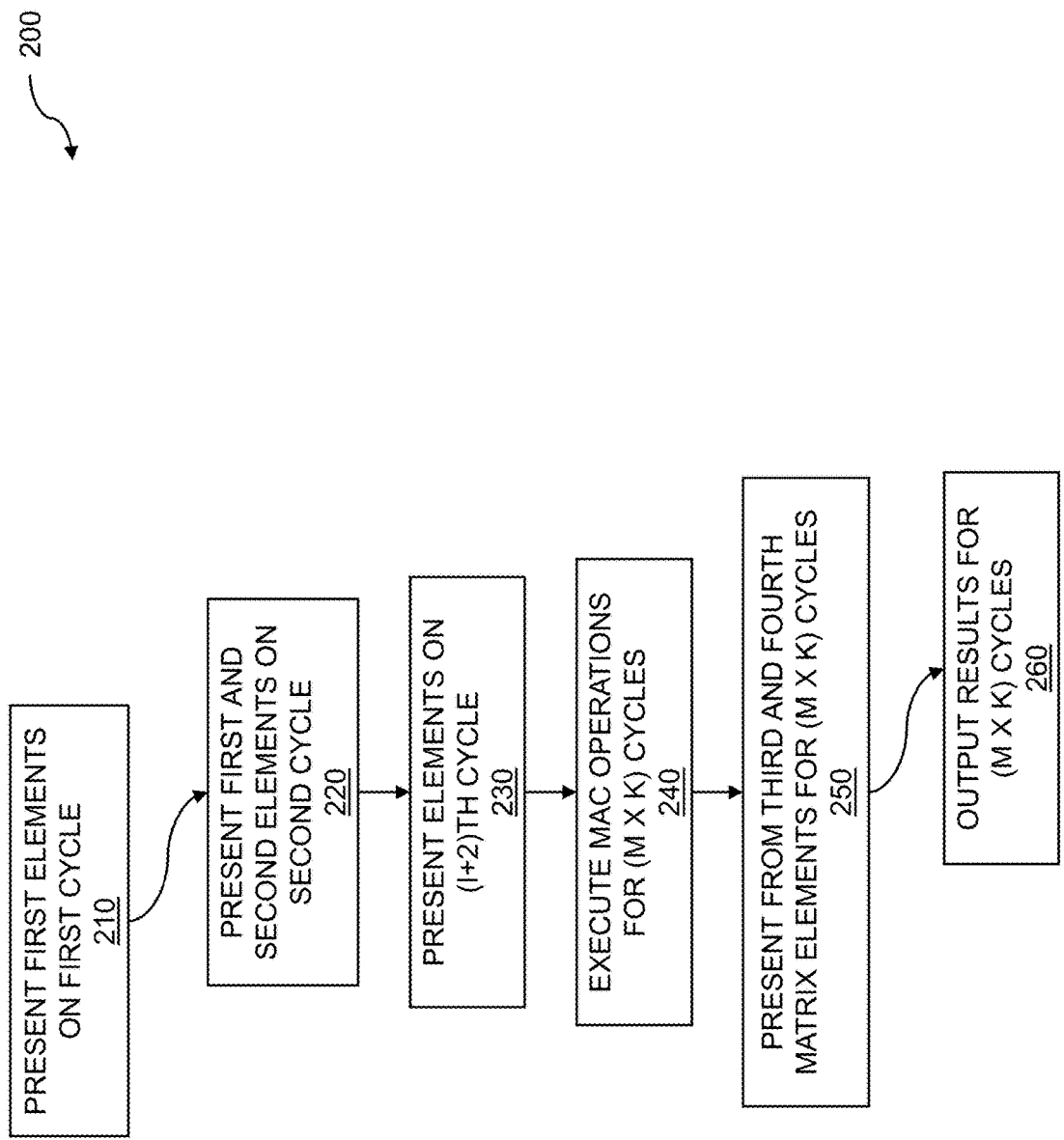
FIG. 2 is a flow diagram for cycle calculation.

FIG. 2 is a flow diagram for cycle calculation. Discussed throughout, elements of matrices can be presented to multiply-accumulate units at one or more cycles such as execution cycles. By coordinating the presenting of the matrix elements, the multiply-accumulate or MAC operations can be accomplished substantially in parallel in support of a pipelined execution. The elements of the matrices can be placed in memory, where the memory can be accessed by the one or processors within which the MAC units are configured. A processor and memory subsystem can be allocated as part of one or more clusters within a reconfigurable fabric to implement MAC units. The reconfigurable fabric can comprise one or more types of elements, where the elements within the reconfigurable fabric can be configured, programmed, scheduled, etc. In embodiments, each cluster of the one or more clusters within the reconfigurable fabric comprises processing elements, switching elements, or storage elements. In order for the clusters of elements within the reconfigurable fabric to accomplish the operations of the MAC units, the clusters can be controlled. In embodiments, each cluster of the one or more clusters within the reconfigurable fabric can be controlled by one or more circular buffers. The circular buffers can be loaded with instructions, code, a schedule, and the like. In embodiments, the one or more circular buffers are statically scheduled. The processor and memory subsystems, MACs, etc., can comprise elements of a matrix multiplication engine. The matrix multiplication engine uses pipelining to reduce the number of cycles required to perform the matrix multiplications performed by the matrix multiplication engine.

The flow 200 can include presenting a first element of a first matrix and a first element of a second matrix 210 to a first MAC unit on a first cycle. The multiply-accumulate (MAC) unit can be configured within a processor. The processor can include a CPU or GPU, a configurable or programmable chip such as an FPGA or ASIC, one or more clusters of elements within a reconfigurable fabric, and so on. The presenting of the first element of the first matrix and the first element of the second matrix can be based on presenting valid data to the MAC. Valid data can be identified based on a value, a code, a flag, etc. The presenting of the elements can include a data flow view of matrix multiplication. The flow 200 can include presenting the first element of the first matrix and a second element of the second matrix to the second MAC unit on a second cycle 220. A second element of the first matrix and the first element of the second matrix can also be presented to the first MAC unit on the second cycle. The presenting of the elements can also be based on presenting valid data. The presenting to the first MAC and the presenting to the second MAC can include presenting to two stages of a pipeline.

The flow 200 can include presenting the first element of the first matrix and an $i_{th}$ element of the second matrix to an $i_{th}$ MAC unit 230 on an $(i+2)_{th}$ cycle. Matrix elements from the first matrix and matrix elements from the second matrix can be presented to further MACs. The number of MACs to which the matrix elements can be presented can include a number between three MACs and n MACs, where n can refer to a number of columns of the second matrix. The flow 200 can include executing multiply-accumulate operations in pipelined fashion on each of the n MAC units for a total of (m×k) cycles 240. The executing can include calculating partial products (multiply) and adding the partial products to a running sum (accumulate). The n MAC units can execute the MAC operations independently, in parallel, etc. In embodiments, additional m elements from the first matrix are presented over additional k sets of m cycles.

The performing matrix multiplication by the matrix multiplication engine need not be limited to matrix multiplication of the first matrix and the second matrix. The flow 200 can include presenting a first element from a third matrix and a first element from a fourth matrix to the first MAC unit 250 after (m×k) cycles. After m×k cycles, all elements of the first matrix have been presented to the MAC units. Elements from the third matrix and elements from the fourth matrix can be presented to the first MAC without interfering with the matrix multiplication of the first matrix and the second matrix. The flow 200 can include outputting the results of the matrix multiplication to a storage element, where the outputting takes an additional (m×k) cycles 260. The storage element can include memory such as direct memory access (DMA) memory, remote DMA (RDMA) memory, high performance memory (HPM), and the like. HPM can include high bandwidth memory (HBM™) or other fast memory. The storage can include registers or a register file. The storage element can include a memory of a processor and memory subsystem. The storage element can include one or more clusters of elements such as storage elements within a reconfigurable fabric. The multiply-accumulate operations can be accomplished in a systolic array. This systolic array can include a homogenous network made up of data processing units that are tightly coupled. Each of the data processing units can be considered a node. The executing of the multiply-accumulate operations can be accomplished using time-division multiplexing. In embodiments, a systolic array can have one or more rows folded into another row to form a slice of processing units. The processing units within the slice are then time-division multiplexed to implement the function of a systolic array. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

FIG. 3 shows matrix multiplication 300. Matrix multiplication is an operation that can be used to generate one matrix, such as an output matrix, from two matrices, such as two input matrices. Matrix multiplication is a basic operation of linear algebra. Matrix multiplication is relevant to many applications found in disciplines such as engineering and physics, computer science, statistics, economics, applied mathematics, business analytics, and so on. For a first matrix with dimensions m×k, and a second matrix with dimensions k×n, the product matrix resulting from the multiplication of the first matrix and the second matrix is a matrix with dimensions m×n. Matrix multiplication can be accomplished by a matrix multiplication engine using pipelining. A first matrix and a second matrix are obtained, and a first matrix multiply-accumulate (MAC) unit is configured within a processor. A first element of the first matrix and a first element of the second matrix are presented to the first MAC unit on a first cycle. A second MAC is configured within the processor in pipelined fashion. The first element of the first matrix and a second element of the second matrix are presented to the second MAC unit on a second cycle, and a second element of the first matrix and the first element of the second matrix are presented to the first MAC unit on the second cycle. Additional MAC units are configured in pipelined fashion. An $i_{th}$ MAC unit accepts input elements of the first matrix and the second matrix, where i is an integer in the range (3≤i≤n). The first element of the first matrix and an $i_{th}$ element of the second matrix are presented to the $i_{th}$ MAC unit on an $(i+2)_{th}$ cycle. Multiply-accumulate operations are executed in pipelined fashion on each of the n MAC units for a total of (m×k) cycles. Additional m elements from the first matrix are presented over additional k sets of m cycles. The results of the matrix multiplication are output to a storage element, where the outputting takes an additional (m×k) cycles.

A first matrix, matrix A 310 is shown. Matrix A includes dimensions 4×3. A second matrix, matrix B 320 is further shown. Matrix B includes dimensions 3×3. To compute the product matrix AB that results from multiplying matrix A by matrix B, input elements of each row of matrix A are multiplied by input elements of each column of matrix B. A sum of products is computed. The sum of products becomes an output element in the product matrix corresponding to the row number of matrix A and the column number of matrix B such that:

$AB_{ij} = \Sigma_{i=1}^{k} a_{il} b_{lj}$ For $i=1$ to $k$, and $j=1$ to $n$.

To compute the first element of product matrix $ab_{11}$, element $a_{11}$ is multiplied by each element of the first column of matrix B, and the partial products are added together or accumulated to compute $ab_{11} = a_{11}b_{11} + a_{11}b_{21} + a_{11}b_{31}$. These multiply-accumulate steps can be repeated for each input element of matrix A and each input element of matrix B to compute the other elements $ab_{ij}$ of the product matrix AB 330.

Figure 4:
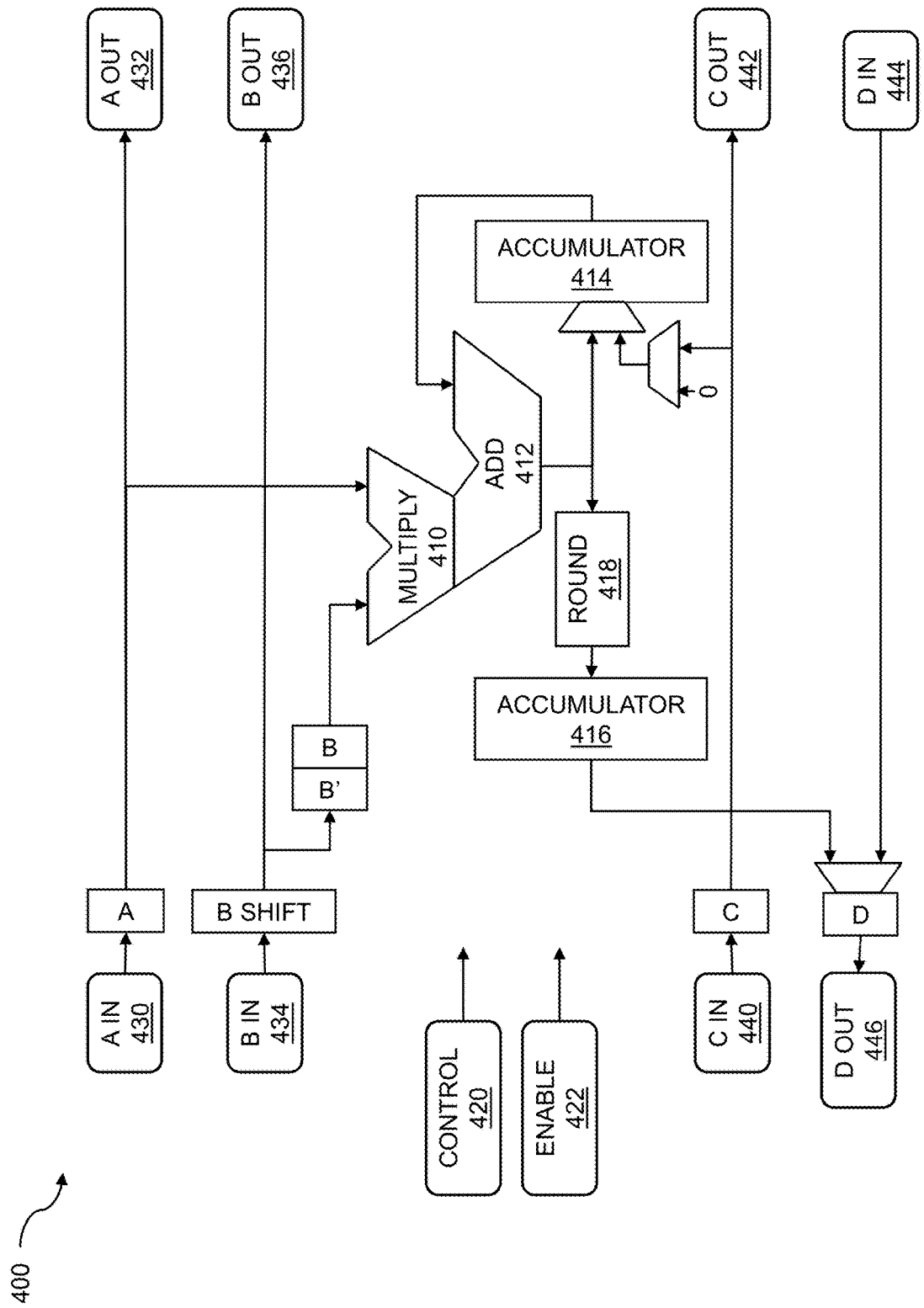
FIG. 4 illustrates an example multiply-accumulate (MAC) block diagram.

FIG. 4 illustrates an example multiply-accumulate (MAC) block diagram. One or more MAC units can be configured within a processor. The MAC units can be used to execute MAC instructions. The executing MAC instructions can enable a matrix multiplication engine using pipelining. A first matrix with dimensions m×k and a second matrix with dimensions k×n are obtained for matrix multiplication within a processor. The processor can include a CPU or a GPU, or can be based on an FPGA or ASIC. The processor can be configured from clusters of elements within a reconfigurable fabric. A first matrix multiply-accumulate (MAC) unit is configured within the processor. A second matrix multiply-accumulate (MAC) unit and additional matrix multiply-accumulate (MAC) units are configured within the processor in pipelined fashion. Input elements from the first matrix and input elements from the second matrix are presented to the MAC units on multiple cycles. Multiply-accumulate operations are executed in pipelined fashion on each of the n MAC units over multiple cycles. The results of the matrix multiplication are output to a storage element over additional cycles. When the MAC operations that comprise the matrix multiplication of the first matrix by the second have been accomplished, further matrices for matrix multiplication can be obtained. Further embodiments include presenting a first element from a third matrix and a first element from a fourth matrix to the first MAC unit after a number of cycles, where the number of cycles can include (m×k) cycles. Further input elements from the third matrix and further input elements from the fourth matrix can also be presented.

An example multiply-accumulate (MAC) block diagram 400 is shown. A MAC unit can multiply two values such as input elements from a matrix, add the partial product computed by the multiplication to any previously calculated partial products, and store the running total or "accumulation" in a register, storage, and the like. A MAC unit comprises a multiplier 410 and an adder 412. The multiplier can multiply two values such as an input element of the first matrix and an input element of the second matrix. The result of multiplying the input elements, the partial product, can be added to a running sum of any previous partial products. The sum can be stored in an accumulator 414. An initial value can be loaded into the accumulator 414 as a step in performing one or more MAC operations. The initial value can include zero. In embodiments, the initial value can include a seed or bias value. The bias value can be seeded (input) to the MAC unit via an input, as discussed below. Initializing, enabling, controlling, and so on, of the MAC unit can be accomplished using signals. In embodiments, the signals coupled to the MAC can include one or more control signals 420, one or more enable signals 422, etc. The one or more control signals 420 can include load, clear, reset, seed, and the like. The one or more enable signals 422 can enable one or more MAC units, enable one or more components within a MAC unit, and the like.

As discussed throughout, matrices can be presented to a MAC unit, where the MAC unit can perform MAC operations upon elements of the matrices to compute a matrix multiplication, a tensor operation, etc. A first matrix A 430 and a second matrix B 434 can be input to the MAC unit. The first or A matrix can be loaded into a register, storage, and so on. The second or B matrix can be loaded into a register, storage, a shift register, etc. In embodiments, the A input and the B input can be forwarded to other MACs such as downstream MACs or MACs that occur later in a pipeline. The A input can be coupled to an A output 432, the B input can be coupled to a B output 436, and so on. The input elements to the MAC can be pipelined. Further embodiments can include pipelining input elements to the MAC units through two or more input registers. In the example MAC 400, the B input can be pipelined through two input registers, B and B'. As discussed throughout, an initial value, a bias value, a seed value, etc., can be loaded into accumulator 414. In embodiments, the MAC 400 includes a C input 440. The C input can be held in a register, loaded into storage, etc. In embodiments, the C input can be passed through, propagated to, and so on, other elements of the pipeline of MAC units. The C input can be coupled to an output C output 442.

The results of executing MAC operations in pipelined fashion on each MAC unit can be manipulated, accumulated, and so on. In the example, manipulating results of executing the MAC operations can include rounding 418. Recall that multiplying two values can result in a product comprising twice as many bits as the two input values, where the input values include the multiplicand and the multiplier. Products, partial products, etc., can be manipulated to reduce the number of bits within a given product or partial product. The reduction of the number of bits can be accomplished by scaling, normalizing, truncating, rounding, and the like. The value or values that result from the manipulation of the partial products, for example, can be collected in an accumulator 416. The accumulator can hold products, partial products, matrix products, etc. The results of executing MAC operations in pipelined fashion on each MAC unit can be output. In the example MAC FIG. 400, a D output 446 can be provided. The D output can include a value held in accumulator 416. In other embodiments, the D output can be coupled to a D input 444. The D input to D output coupling can be used to pass through, transfer, etc., values from other MAC units within the pipeline.

Figure 5:
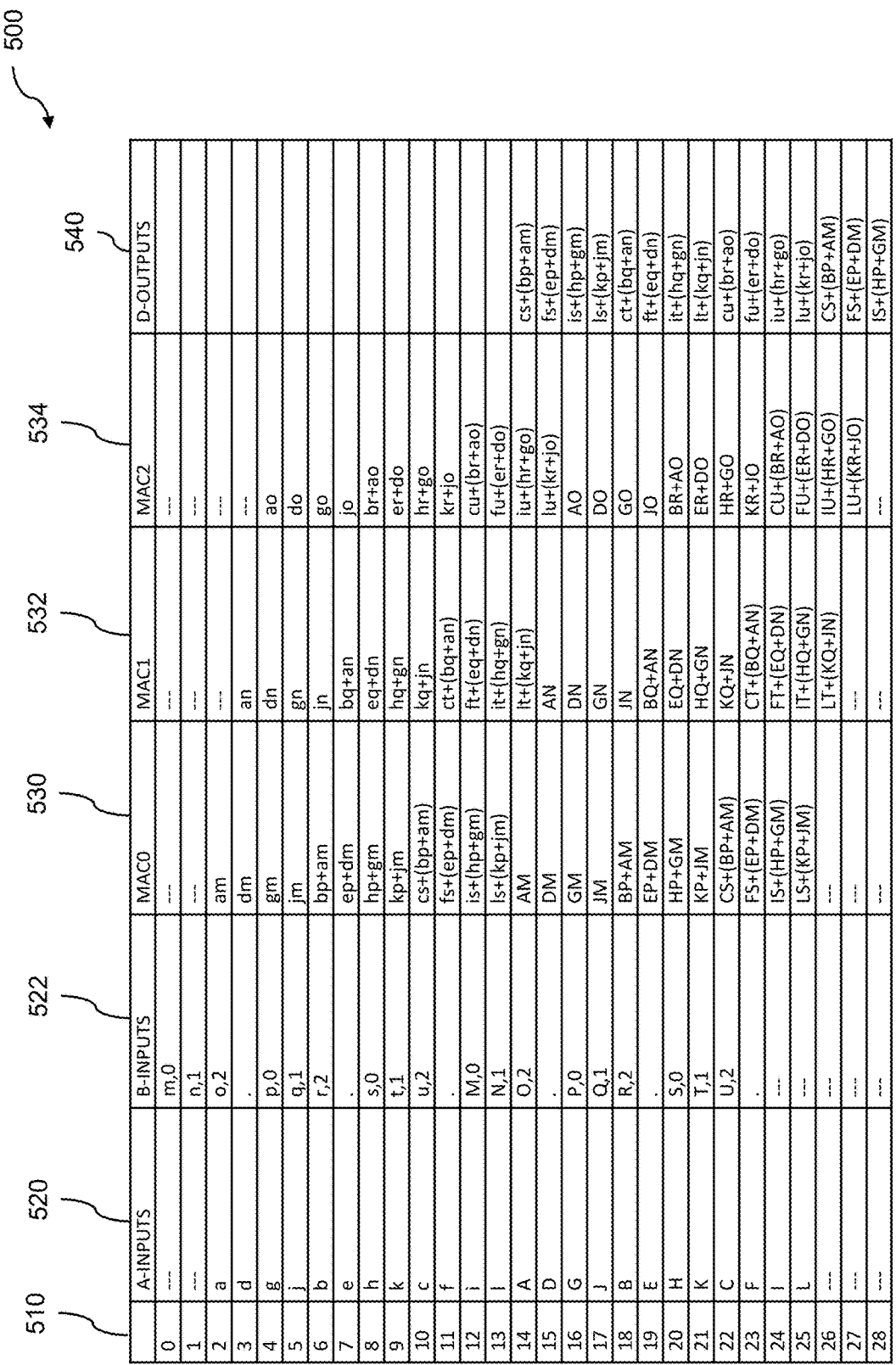
FIG. 5 shows pipelined matrix multiply results.

FIG. 5 shows pipelined matrix multiply results. Two matrices can be multiplied together for a variety of data manipulation purposes. The data manipulation can include matrix or tensor operations, logical or arithmetic operations, etc. The matrices can be multiplied by a matrix multiplication engine using pipelining. The matrix multiplication engine can perform n MAC operations in parallel to reduce the amount of time taken to perform the n MAC operations from an order of magnitude of $n^3$ to an order of magnitude of $n^2$. A first matrix with dimensions m×k and a second matrix with dimensions k×n are obtained for matrix multiplication within a processor. A first matrix multiply-accumulate (MAC) unit is configured within the processor, where the first MAC unit accepts input elements of the first matrix and the second matrix, where a first element of the first matrix and a first element of the second matrix are presented to the first MAC unit on a first cycle. A second MAC unit within the processor is configured in pipelined fashion where the second MAC unit accepts input elements of the first matrix and the second matrix, where the first element of the first matrix and a second element of the second matrix are presented to the second MAC unit on a second cycle, and where a second element of the first matrix and the first element of the second matrix are presented to the first MAC unit on the second cycle. One or more additional MAC units are further configured within the processor in pipelined fashion such that a total of n MAC units are configured, where an $i_{th}$ MAC unit accepts input elements of the first matrix and the second matrix, where i is an integer in the range (3≤i≤n), where the first element of the first matrix and an $i_{th}$ element of the second matrix are presented to the $i_{th}$ MAC unit on an $(i+2)_{th}$ cycle. Multiply-accumulate operations are executed in pipelined fashion on each of the n MAC units for a total of (m×k) cycles, where additional m elements from the first matrix are presented over an additional k sets of m cycles.

Pipelined matrix multiply results are shown in table 500. The matrix multiply results can correspond to the matrix multiplication example described previously. Input elements of the first matrix and input elements of the second matrix are presented to three or more MAC units during multiple cycles. A pipeline can include multiple stages or units such as configured MAC units. Since the MAC units are configured in pipelined fashion, data presented at the beginning of the pipeline on a given cycle can work its way through the pipeline. Data can advance from one pipeline stage to the next pipeline stage a cycle at a time. In embodiments, an initial bias can be seeded for a given matrix multiplication operation. Data such as input elements from a matrix progresses from one MAC to a next MAC on each cycle. As such, the pipeline fills over a number of cycles or an amount of time. MACs that are presented with valid data for a given cycle can execute a MAC instruction during that cycle. In embodiments, the next MAC in the pipeline can receive the valid data on the next cycle. MACs that have not been presented with valid data for the given cycle can execute idle or NOP instructions during that cycle. Column 510 shows cycles. Initially, the A inputs 520 can be "don't cares", while the B inputs 522 can be reset to zero or loaded with data such as input elements of the second matrix. Three MACs are shown for the table 500, MAC0 530, MAC1 532, and MAC2 534. In embodiments, a total of n MAC units are configured, where n is the number of columns of the second matrix or B matrix. The MAC operations are executed. In embodiments, multiply-accumulate operations can be executed in pipelined fashion on each of the n MAC units for a total of (m×k) cycles. An additional m elements from the first matrix are presented over an additional k sets of m cycles. After an appropriate number of cycles, results of executing the MAC operations are available for output at the D outputs 540. In embodiments, the results of the matrix multiplication can be output to a storage element, where the outputting takes an additional (m×k) cycles.

Figure 6:
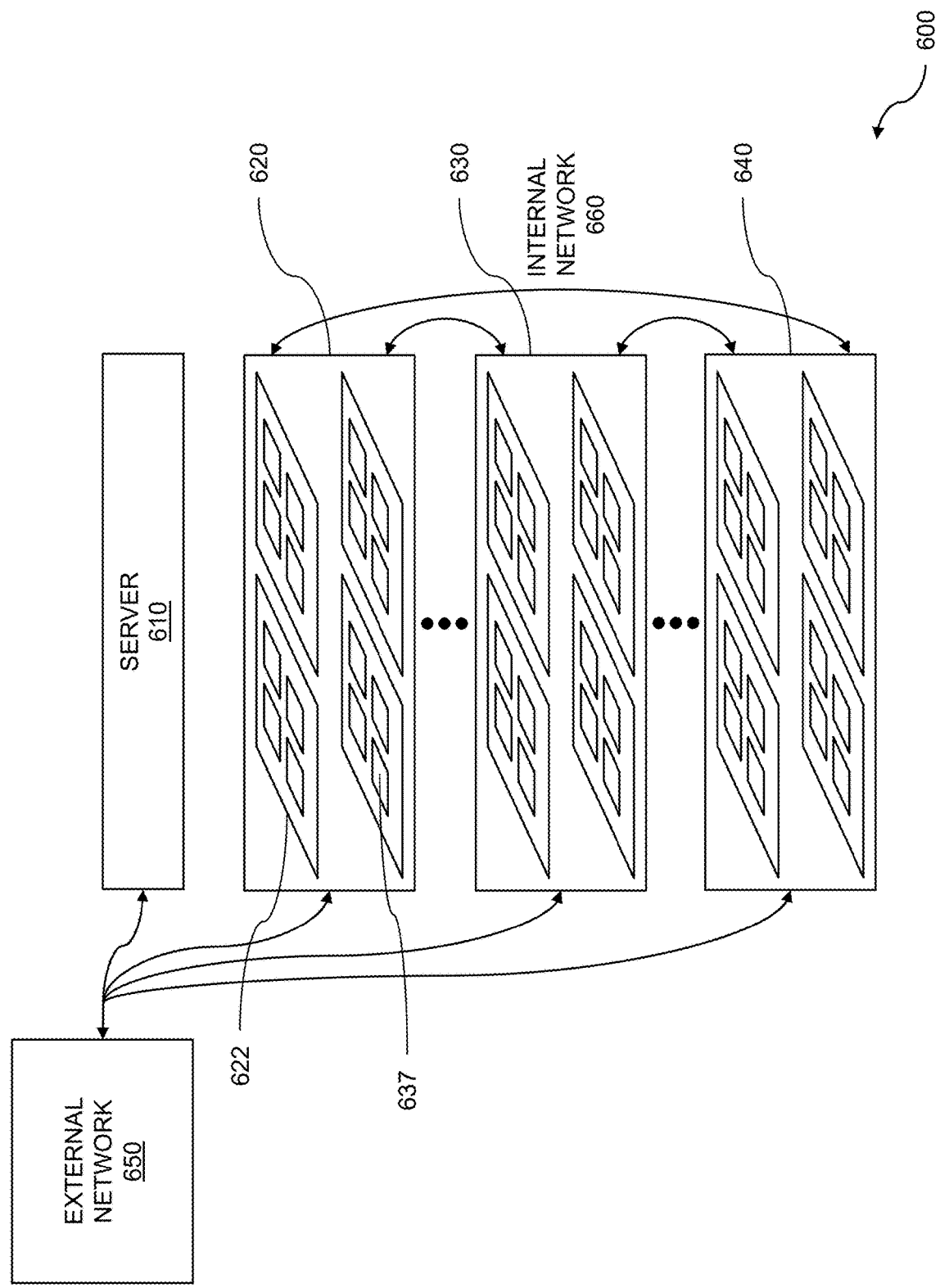
FIG. 6 shows allocation of FIFOs and processing elements.

FIG. 6 shows a server allocating FIFOs and processing elements. A data flow graph, directed flow graph, Petri Net, network, and so on, can be allocated to first in first out registers (FIFO) and to elements. The FIFO registers and the elements can include elements within a processor, within a reconfigurable processor, and so on. The elements can include processing elements, storage elements, switching elements, and the like. Pipelining techniques can be used to support a matrix multiplication engine. The FIFOs and the processing elements can be elements within a reconfigurable fabric. The processing elements can be grouped into clusters, where the clusters can be configured to execute one or more functions, operations, etc. The processing elements can be configured to implement kernels, agents, a data flow graph, a network, and so on, by programming, coding, or "scheduling" rotating circular buffers. The circular buffers can be statically scheduled. A first matrix with dimensions m×k and a second matrix with dimensions k×n are obtained for matrix multiplication within a processor. A first matrix multiply-accumulate (MAC) unit is configured within the processor, where the first MAC unit accepts input elements of the first matrix and the second matrix. A second MAC unit is configured within the processor in pipelined fashion where the second MAC unit accepts input elements of the first matrix and the second matrix. Additional MAC units are further configured within the processor in pipelined fashion such that a total of n MAC units are configured, where an $i_{th}$ MAC unit accepts input elements of the first matrix and the second matrix. Multiply-accumulate operations are executed in pipelined fashion on each of the n MAC units.

The system 600 can allocate one or more first in first outs (FIFOs) and processing elements (PEs) for reconfigurable fabric data routing. The system can include a server 610 allocating FIFOs and processing elements. In embodiments, system 600 includes one or more boxes, indicated by callouts 620, 630, and 640. Each box may have one or more boards, indicated generally as 622. Each board comprises one or more chips, indicated generally as 637. Each chip may include one or more processing elements, where at least some of the processing elements may execute a process agent, a kernel, or the like. An internal network 660 allows for communication between and among the boxes such that processing elements on one box can provide and/or receive results from processing elements on another box.

The server 610 may be a computer executing programs on one or more processors based on instructions contained in a non-transitory computer readable medium. The server 610 may perform reconfiguring of a mesh-networked computer system comprising a plurality of processing elements with a FIFO between one or more pairs of processing elements. In some embodiments, each pair of processing elements has a dedicated FIFO configured to pass data between the processing elements of the pair. The server 610 may receive instructions and/or input data from external network 650.

The external network may provide information that includes, but is not limited to, hardware description language instructions (e.g. Verilog, VHDL, or the like), flow graphs, source code, or information in another suitable format.

The server 610 may collect performance statistics on the operation of the collection of processing elements. The performance statistics can include the number of fork or join operations, average sleep time of a processing element, and/or a histogram of the sleep time of each processing element. Any outlier processing elements that sleep for a time period longer than a predetermined threshold can be identified. In embodiments, the server can resize FIFOs or create new FIFOs to reduce the sleep time of a processing element that exceeds the predetermined threshold. Sleep time is essentially time when a processing element is not producing meaningful results, so it is generally desirable to minimize the amount of time a processing element spends in a sleep mode. In some embodiments, the server 610 may serve as an allocation manager to process requests for adding or freeing FIFOs, and/or changing the size of existing FIFOs in order to optimize operation of the processing elements.

In some embodiments, the server may receive optimization settings from the external network 650. The optimization settings may include a setting to optimize for speed, optimize for memory usage, or balance between speed and memory usage. Additionally, optimization settings may include constraints on the topology, such as a maximum number of paths that may enter or exit a processing element, maximum data block size, and other settings. Thus, the server 610 can perform a reconfiguration based on user-specified parameters via the external network 650.

Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include calculation input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs positioned in arrangements such as quads can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be a portion of a data flow graph. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. A configuration mode can be entered. Various techniques, including direct memory access (DMA) can be used to load instructions from the kernel into instruction memories of the PEs. The clusters that were preprogrammed to enter configuration mode can be preprogrammed to exit configuration mode. When configuration mode has been exited, execution of the one or more kernels loaded onto the clusters can commence. In embodiments, clusters can be reprogrammed and during the reprogramming, switch instructions used for routing are not disrupted so that routing continues through a cluster.

Data flow processes that can be executed by data flow processors can be managed by a software stack. A software stack can include a set of subsystems, including software subsystems, which may be needed to create a software platform. A complete software platform can include a set of software subsystems required to support one or more applications. A software stack can include both offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so one. The agent source code that can be operated on by the software development kit can be stored in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit can include a variety of tools which can be used to support a deep learning technique or other technique which requires processing of large amounts of data such as unstructured data. The SDK can support multiple machine learning techniques such as machine learning techniques based on GEMM™, sigmoid, and so on. The SDK can include a low-level virtual machine (LLVM) which can serve as a front end to the SDK. The SDK can include a simulator. The SDK can include a Boolean satisfiability solver (SAT solver). The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a flow graph.

Figure 7:
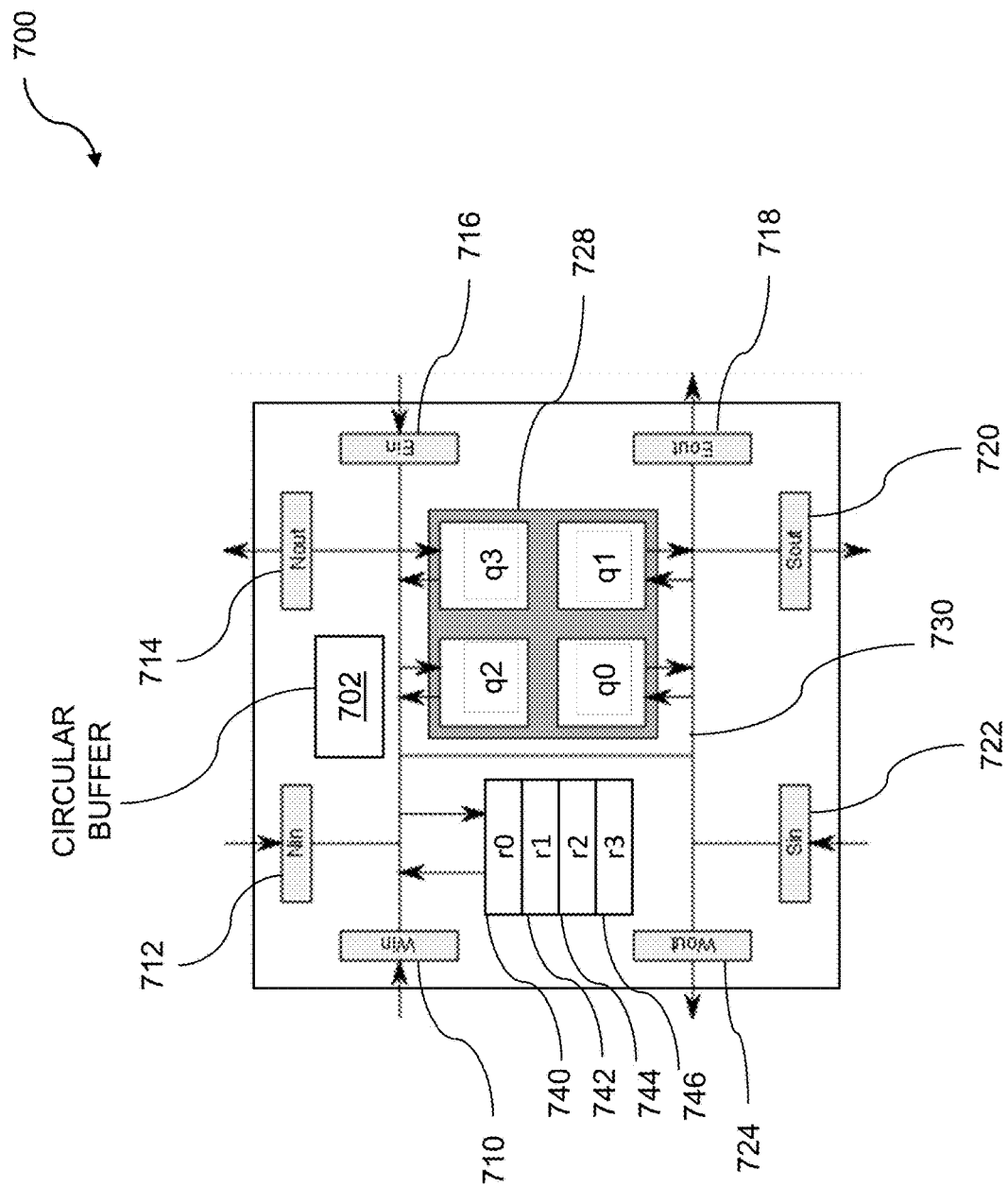
FIG. 7 shows a cluster for coarse-grained reconfigurable processing.

FIG. 7 shows a cluster for coarse-grained reconfigurable processing. The cluster 700 for coarse-grained reconfigurable processing can be used for a matrix multiplication engine using pipelining. The matrix multiplication engine can be implemented within a processor, reconfigurable hardware such as a reconfigurable fabric, and so on. The configuration of the reconfigurable fabric includes allocating a plurality of clusters within a reconfigurable fabric, where the plurality of clusters is configured to execute one or more functions. The functions can include logical calculations, matrix calculations, tensor calculations, multiply-accumulation operations, etc. The clusters can include processing elements, switching elements, storage elements, and so on. A first matrix and a second matrix are obtained for matrix multiplication within a processor. A first matrix multiply-accumulate (MAC) unit is configured within the processor, where the first MAC unit accepts input elements of the first matrix and the second matrix. A second MAC unit is configured within the processor in pipelined fashion where the second MAC unit accepts input elements of the first matrix and the second matrix. One or more additional MAC units are further configured within the processor in pipelined fashion. Multiply-accumulate operations are executed in pipelined fashion on each of the n MAC units.

The cluster 700 comprises a circular buffer 702. The circular buffer 702 can be referred to as a main circular buffer or a switch-instruction circular buffer. In some embodiments, the cluster 700 comprises additional circular buffers corresponding to processing elements within the cluster. The additional circular buffers can be referred to as processor instruction circular buffers. The example cluster 700 comprises a plurality of logical elements, configurable connections between the logical elements, and a circular buffer 702 controlling the configurable connections. The logical elements can further comprise one or more of switching elements, processing elements, or storage elements. The example cluster 700 also comprises four processing elements—q0, q1, q2, and q3. The four processing elements can collectively be referred to as a "quad," and can be jointly indicated by a grey reference box 728. In embodiments, there is intercommunication among and between each of the four processing elements. In embodiments, the circular buffer 702 controls the passing of data to the quad of processing elements 728 through switching elements. In embodiments, the four processing elements 728 comprise a processing cluster. In some cases, the processing elements can be placed into a sleep state. In embodiments, the processing elements wake up from a sleep state when valid data is applied to the inputs of the processing elements. In embodiments, the individual processors of a processing cluster share data and/or instruction caches. The individual processors of a processing cluster can implement message transfer via a bus or shared memory interface. Power gating can be applied to one or more processors (e.g. q1) in order to reduce power.

The cluster 700 can further comprise storage elements coupled to the configurable connections. As shown, the cluster 700 comprises four storage elements—r0 740, r1 742, r2 744, and r3 746. The cluster 700 further comprises a north input (Nin) 712, a north output (Nout) 714, an east input (Ein) 716, an east output (Eout) 718, a south input (Sin) 722, a south output (Sout) 720, a west input (Win) 710, and a west output (Wout) 724. The circular buffer 702 can contain switch instructions that implement configurable connections. For example, an instruction effectively connects the west input 710 with the north output 714 and the east output 718 and this routing is accomplished via bus 730. The cluster 700 can further comprise a plurality of circular buffers residing on a semiconductor chip where the plurality of circular buffers controls unique, configurable connections between and among the logical elements. The storage elements can include instruction random access memory (I-RAM) and data random access memory (D-RAM). The I-RAM and the D-RAM can be quad I-RAM and quad D-RAM, respectively, where the I-RAM and/or the D-RAM supply instructions and/or data, respectively, to the processing quad of a switching element.

A preprocessor or compiler can be configured to prevent data collisions within the circular buffer 702. The prevention of collisions can be accomplished by inserting no-op (NOP) or sleep instructions into the circular buffer (pipeline). Alternatively, in order to prevent a collision on an output port, intermediate data can be stored in registers for one or more pipeline cycles before being sent out on the output port. In other situations, the preprocessor can change one switching instruction to another switching instruction to avoid a conflict. For example, in some instances the preprocessor can change an instruction placing data on the west output 724 to an instruction placing data on the south output 720, such that the data can be output on both output ports within the same pipeline cycle. In a case where data needs to travel to a cluster that is both south and west of the cluster 700, it can be more efficient to send the data directly to the south output port rather than to store the data in a register first, and then to send the data to the west output on a subsequent pipeline cycle.

An L2 switch interacts with the instruction set. A switch instruction typically has both a source and a destination. Data is accepted from the source and sent to the destination. There are several sources (e.g. any of the quads within a cluster, any of the L2 directions—North, East, South, West, a switch register, or one of the quad RAMs—data RAM, IRAM, PE/Co Processor Register). As an example, to accept data from any L2 direction, a "valid" bit is used to inform the switch that the data flowing through the fabric is indeed valid. The switch will select the valid data from the set of specified inputs. For this to function properly, only one input can have valid data, and the other inputs must all be marked as invalid. It should be noted that this fan-in operation at the switch inputs operates independently for control and data. There is no requirement for a fan-in mux to select data and control bits from the same input source. Data valid bits are used to select valid data, and control valid bits are used to select the valid control input. There are many sources and destinations for the switching element, which can result in excessive instruction combinations, so the L2 switch has a fan-in function enabling input data to arrive from one and only one input source. The valid input sources are specified by the instruction. Switch instructions are therefore formed by combining a number of fan-in operations and sending the result to a number of specified switch outputs.

In the event of a software error, multiple valid bits may arrive at an input. In this case, the hardware implementation can perform any safe function of the two inputs. For example, the fan-in could implement a logical OR of the input data. Any output data is acceptable because the input condition is an error, so long as no damage is done to the silicon. In the event that a bit is set to '1' for both inputs, an output bit should also be set to '1'. A switch instruction can accept data from any quad or from any neighboring L2 switch. A switch instruction can also accept data from a register or a microDMA controller. If the input is from a register, the register number is specified. Fan-in may not be supported for many registers as only one register can be read in a given cycle. If the input is from a microDMA controller, a DMA protocol is used for addressing the resource.

For many applications, the reconfigurable fabric can be a DMA slave, which enables a host processor to gain direct access to the instruction and data RAMs (and registers) that are located within the quads in the cluster. DMA transfers are initiated by the host processor on a system bus. Several DMA paths can propagate through the fabric in parallel. The DMA paths generally start or finish at a streaming interface to the processor system bus. DMA paths may be horizontal, vertical, or a combination (as determined by a router). To facilitate high bandwidth DMA transfers, several DMA paths can enter the fabric at different times, providing both spatial and temporal multiplexing of DMA channels. Some DMA transfers can be initiated within the fabric, enabling DMA transfers between the block RAMs without external supervision. It is possible for a cluster "A", to initiate a transfer of data between cluster "B" and cluster "C" without any involvement of the processing elements in clusters "B" and "C". Furthermore, cluster "A" can initiate a fan-out transfer of data from cluster "B" to clusters "C", "D", and so on, where each destination cluster writes a copy of the DMA data to different locations within their Quad RAMs. A DMA mechanism may also be used for programming instructions into the instruction RAMs.

Accesses to RAMs in different clusters can travel through the same DMA path, but the transactions must be separately defined. A maximum block size for a single DMA transfer can be 8 KB. Accesses to data RAMs can be performed either when the processors are running or while the processors are in a low power "sleep" state. Accesses to the instruction RAMs and the PE and Co-Processor Registers may be performed during configuration mode. The quad RAMs may have a single read/write port with a single address decoder, thus allowing shared access by the quads and the switches. The static scheduler (i.e. the router) determines when a switch is granted access to the RAMs in the cluster. The paths for DMA transfers are formed by the router by placing special DMA instructions into the switches and determining when the switches can access the data RAMs. A microDMA controller within each L2 switch is used to complete data transfers. DMA controller parameters can be programmed using a simple protocol that forms the "header" of each access.

In embodiments, the computations that can be performed on a cluster for coarse-grained reconfigurable processing can be represented by a data flow graph. Data flow processors, data flow processor elements, and the like, are particularly well suited to processing the various nodes of data flow graphs. The data flow graphs can represent communications between and among agents, matrix computations, tensor manipulations, Boolean functions, and so on. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of high quality data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs arranged in configurations such as quads can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value of minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the clusters enter the configuration mode, various techniques, including direct memory access (DMA) can be used to load instructions from the kernel into instruction memories of the PEs. The clusters that were preprogrammed to enter configuration mode can also be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as those based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

A reconfigurable fabric can include quads of elements. The elements of the reconfigurable fabric can include processing elements, switching elements, storage elements, and so on. An element such as a storage element can be controlled by a rotating circular buffer. In embodiments, the rotating circular buffer can be statically scheduled. The data operated on by the agents that are resident within the reconfigurable buffer can include tensors. Tensors can include one or more blocks. The reconfigurable fabric can be configured to process tensors, tensor blocks, tensors and blocks, etc. One technique for processing tensors includes deploying agents in a pipeline. That is, the output of one agent can be directed to the input of another agent. Agents can be assigned to clusters of quads, where the clusters can include one or more quads. Multiple agents can be pipelined when there are sufficient clusters of quads to which the agents can be assigned. Multiple pipelines can be deployed. Pipelining of the multiple agents can reduce the sizes of input buffers, output buffers, intermediate buffers, and other storage elements. Pipelining can further reduce memory bandwidth needs of the reconfigurable fabric.

Agents can be used to support dynamic reconfiguration of the reconfigurable fabric. The agents that support dynamic reconfiguration of the reconfigurable fabric can include interface signals in a control unit. The interface signals can include suspend, agent inputs empty, agent outputs empty, and so on. The suspend signal can be implemented using a variety of techniques such as a semaphore, a streaming input control signal, and the like. When a semaphore is used, the agent that is controlled by the semaphore can monitor the semaphore. In embodiments, a direct memory access (DMA) controller can wake the agent when the setting of the semaphore has been completed. The streaming control signal, if used, can wake a control unit if the control unit is sleeping. A response received from the agent can be configured to interrupt the host software.

The suspend semaphore can be asserted by runtime software in advance of commencing dynamic reconfiguration of the reconfigurable fabric. Upon detection of the semaphore, the agent can begin preparing for entry into a partially resident state. A partially resident state for the agent can include having the agent control unit resident after the agent kernel is removed. The agent can complete processing of any currently active tensor being operated on by the agent. In embodiments, a done signal and a fire signal may be sent to upstream or downstream agents, respectively. A done signal can be sent to the upstream agent to indicate that all data has been removed from its output buffer. A fire signal can be sent to a downstream agent to indicate that data in the output buffer is ready for processing by the downstream agent. The agent can continue to process incoming done signals and fire signals, but will not commence processing of any new tensor data after completion of the current tensor processing by the agent. The semaphore can be reset by the agent to indicate to a host that the agent is ready to be placed into partial residency. In embodiments, having the agent control unit resident after the agent kernel is removed comprises having the agent partially resident. A control unit may not assert one or more signals, nor expect one or more responses from a kernel in the agent, when a semaphore has been reset.

Other signals from an agent can be received by a host. The signals can include an agent inputs empty signal, an agent outputs empty signal, and so on. The agent inputs empty signal can be sent from the agent to the host and can indicate that the input buffers are empty. The agent inputs empty signal can only be sent from the agent when the agent is partially resident. The agent outputs empty signal can be sent from the agent to the host and can indicate that the output buffers are empty. The agent outputs empty can only be sent from the agent to the host when the agent is partially resident. When the runtime (host) software receives both signals, agent inputs empty and agent outputs empty, from the partially resident agent, the agent can be swapped out of the reconfigurable fabric and can become fully vacant.

Recall that an agent can be one of a plurality of agents that form a data flow graph. The data flow graph can be based on a plurality of subgraphs. The data flow graph can be based on agents which can support three states of residency: fully resident, partially resident, and fully vacant. A complete subsection (or subgraph) based on the agents that support the three states of residency can be swapped out of the reconfigurable fabric. The swapping out of the subsection can be based on asserting a suspend signal input to an upstream agent. The asserting of the suspend signal can be determined by the runtime software. When a suspend signal is asserted, the agent can stop consuming input data such as an input sensor. The tensor can queue within the input buffers of the agent. The agent kernel can be swapped out of the reconfigurable fabric, leaving the agent partially resident while the agent waits for the downstream agents to drain the output buffers for the agent. When an upstream agent is fully resident, the agent may not be able to be fully vacant because a fire signal might be sent to the agent by the upstream agent. When the upstream agent is partially resident or is fully vacant, then the agent can be fully vacated from the reconfigurable fabric. The agent can be fully vacated if it asserts both the input buffers empty and output buffers empty signals.

Figure 8:
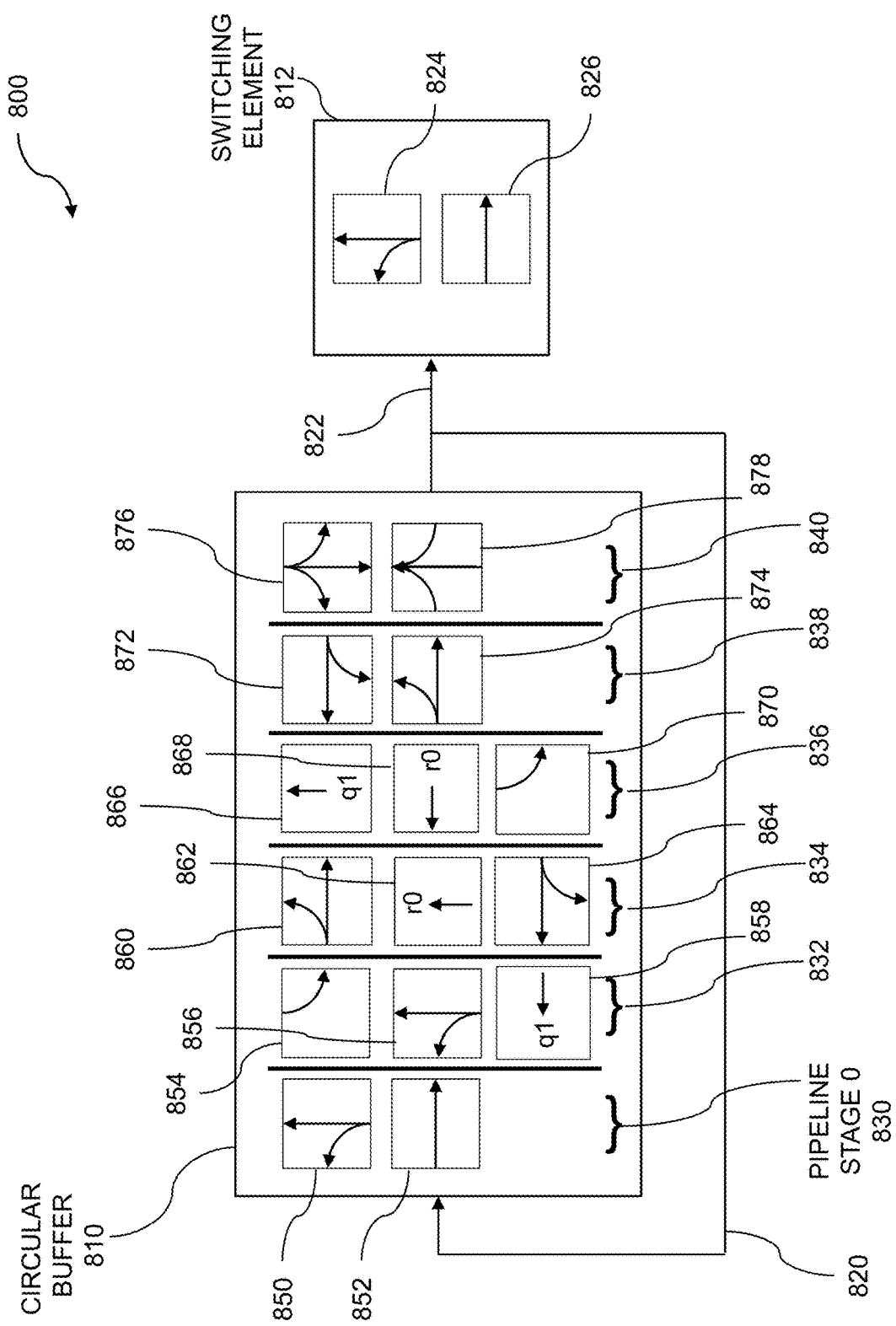
FIG. 8 illustrates a block diagram of a circular buffer.

FIG. 8 illustrates a block diagram 800 of a circular buffer. The circular buffer can include a switching element 812 corresponding to the circular buffer. The circular buffer and the corresponding switching element can be used in part by a matrix multiplication engine using pipelining. Using the circular buffer 810 and the corresponding switching element 812, data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The block diagram 800 describes a processor-implemented method for data manipulation. The circular buffer 810 contains a plurality of pipeline stages. Each pipeline stage contains one or more instructions, up to a maximum instruction depth. In the embodiment shown in FIG. 8, the circular buffer 810 is a 6×3 circular buffer, meaning that it implements a six-stage pipeline with an instruction depth of up to three instructions per stage (column). Hence, the circular buffer 810 can include one, two, or three switch instruction entries per column. In some embodiments, the plurality of switch instructions per cycle can comprise two or three switch instructions per cycle. However, in certain embodiments, the circular buffer 810 supports only a single switch instruction in a given cycle. In the example 800 shown, Pipeline Stage 0 830 has an instruction depth of two instructions 850 and 852. Though the remaining pipeline stages 1-5 are not textually labeled in the FIG. 800, the stages are indicated by callouts 832, 834, 836, 838, and 840. Pipeline stage 1 832 has an instruction depth of three instructions 854, 856, and 858. Pipeline stage 2 834 has an instruction depth of three instructions 860, 862, and 864. Pipeline stage 3 836 also has an instruction depth of three instructions 866, 868, and 870. Pipeline stage 4 838 has an instruction depth of two instructions 872 and 874. Pipeline stage 5 840 has an instruction depth of two instructions 876 and 878. In embodiments, the circular buffer 810 includes 64 columns. During operation, the circular buffer 810 rotates through configuration instructions. The circular buffer 810 can dynamically change operation of the logical elements based on the rotation of the circular buffer. The circular buffer 810 can comprise a plurality of switch instructions per cycle for the configurable connections.

The instruction 852 is an example of a switch instruction. In embodiments, each cluster has four inputs and four outputs, each designated within the cluster's nomenclature as "north," "east," "south," and "west" respectively. For example, the instruction 852 in the diagram 800 is a west-to-east transfer instruction. The instruction 852 directs the cluster to take data on its west input and send out the data on its east output. In another example of data routing, the instruction 850 is a fan-out instruction. The instruction 850 instructs the cluster to take data from its south input and send out the data through both its north output and its west output. The arrows within each instruction box indicate the source and destination of the data. The instruction 878 is an example of a fan-in instruction. The instruction 878 takes data from the west, south, and east inputs and sends out the data on the north output. Therefore, the configurable connections can be considered to be time multiplexed.

In embodiments, the clusters implement multiple storage elements in the form of registers. In the example 800 shown, the instruction 862 is a local storage instruction. The instruction 862 takes data from the instruction's south input and stores it in a register (r0). Another instruction (not shown) is a retrieval instruction. The retrieval instruction takes data from a register (e.g. r0) and outputs it from the instruction's output (north, south, east, west). Some embodiments utilize four general purpose registers, referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible.

The obtaining data from a first switching element and the sending the data to a second switching element can include a direct memory access (DMA). A DMA transfer can continue while valid data is available for the transfer. A DMA transfer can terminate when it has completed without error, or when an error occurs during operation. Typically, a cluster that initiates a DMA transfer will request to be brought out of sleep state when the transfer is complete. This waking is achieved by setting control signals that can control the one or more switching elements. Once the DMA transfer is initiated with a start instruction, a processing element or switching element in the cluster can execute a sleep instruction to place itself to sleep. When the DMA transfer terminates, the processing elements and/or switching elements in the cluster can be brought out of sleep after the final instruction is executed. Note that if a control bit can be set in the register of the cluster that is operating as a slave in the transfer, that cluster can also be brought out of sleep state if it is asleep during the transfer.

The cluster that is involved in a DMA and can be brought out of sleep after the DMA terminates can determine that it has been brought out of a sleep state based on the code that is executed. A cluster can be brought out of a sleep state based on the arrival of a reset signal and the execution of a reset instruction. The cluster can be brought out of sleep by the arrival of valid data (or control) following the execution of a switch instruction. A processing element or switching element can determine why it was brought out of a sleep state by the context of the code that the element starts to execute. A cluster can be awoken during a DMA operation by the arrival of valid data. The DMA instruction can be executed while the cluster remains asleep and awaits the arrival of valid data. Upon arrival of the valid data, the cluster is woken and the data stored. Accesses to one or more data random access memories (RAMs) can be performed when the processing elements and the switching elements are operating. The accesses to the data RAMs can also be performed while the processing elements and/or switching elements are in a low power sleep state.

In embodiments, the clusters implement multiple processing elements in the form of processor cores, referred to as cores q0, q1, q2, and q3. In embodiments, four cores are used, though any number of cores can be implemented. The instruction 858 is a processing instruction. The instruction 858 takes data from the instruction's east input and sends it to a processor q1 for processing. The processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the example 800 shown, the circular buffer 810 rotates instructions in each pipeline stage into switching element 812 via a forward data path 822, and also back to a pipeline stage 0 830 via a feedback data path 820. Instructions can include switching instructions, storage instructions, and processing instructions, among others. The feedback data path 820 can allow instructions within the switching element 812 to be transferred back to the circular buffer. Hence, the instructions 824 and 826 in the switching element 812 can also be transferred back to pipeline stage 0 as the instructions 850 and 852. In addition to the instructions depicted on FIG. 8, a no-op instruction can also be inserted into a pipeline stage. In embodiments, a no-op instruction causes execution to not be performed for a given cycle. In effect, the introduction of a no-op instruction can cause a column within the circular buffer 810 to be skipped in a cycle. In contrast, not skipping an operation indicates that a valid instruction is being pointed to in the circular buffer. A sleep state can be accomplished by not applying a clock to a circuit, performing no processing within a processor, removing a power supply voltage or bringing a power supply to ground, storing information into a non-volatile memory for future use and then removing power applied to the memory, or by similar techniques. A sleep instruction that causes no execution to be performed until a predetermined event occurs which causes the logical element to exit the sleep state can also be explicitly specified. The predetermined event can be the arrival or availability of valid data. The data can be determined to be valid using null convention logic (NCL). In embodiments, only valid data can flow through the switching elements and invalid data points (Xs) are not propagated by instructions.

In some embodiments, the sleep state is exited based on an instruction applied to a switching fabric. The sleep state can, in some embodiments, only be exited by a stimulus external to the logical element and not based on the programming of the logical element. The external stimulus can include an input signal, which in turn can cause a wake up or an interrupt service request to execute on one or more of the logical elements. An example of such a wake-up request can be seen in the instruction 858, assuming that the processor q1 was previously in a sleep state. In embodiments, when the instruction 858 takes valid data from the east input and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 866. In the case of the instruction 866, data from the processor q1 is moved to the north output. In some embodiments, if Xs have been placed into the processor q1, such as during the instruction 858, then Xs would be retrieved from the processor q1 during the execution of the instruction 866 and would be applied to the north output of the instruction 866.

A collision occurs if multiple instructions route data to a particular port in a given pipeline stage. For example, if instructions 852 and 854 are in the same pipeline stage, they will both send data to the east output at the same time, thus causing a collision since neither instruction is part of a time-multiplexed fan-in instruction (such as the instruction 878). To avoid potential collisions, certain embodiments use preprocessing, such as by a compiler, to arrange the instructions in such a way that there are no collisions when the instructions are loaded into the circular buffer. Thus, the circular buffer 810 can be statically scheduled in order to prevent data collisions. Thus, in embodiments, the circular buffers are statically scheduled. In embodiments, when the preprocessor detects a data collision, the scheduler changes the order of the instructions to prevent the collision. Alternatively, or additionally, the preprocessor can insert further instructions such as storage instructions (e.g. the instruction 862), sleep instructions, or no-op instructions, to prevent the collision. Alternatively, or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Returning to DMA, a channel configured as a DMA channel requires a flow control mechanism that is different from regular data channels. A DMA controller can be included in interfaces to master DMA transfer through the processing elements and switching elements. For example, if a read request is made to a channel configured as DMA, the Read transfer is mastered by the DMA controller in the interface. It includes a credit count that calculates the number of records in a transmit (Tx) FIFO that are known to be available. The credit count is initialized based on the size of the Tx FIFO. When a data record is removed from the Tx FIFO, the credit count is increased. If the credit count is positive, and the DMA transfer is not complete, an empty data record can be inserted into a receive (Rx) FIFO. The memory bit is set to indicate that the data record should be populated with data by the source cluster. If the credit count is zero (meaning the Tx FIFO is full), no records are entered into the Rx FIFO. The FIFO to fabric block will ensure that the memory bit is reset to 0, thereby preventing a microDMA controller in the source cluster from sending more data.

Each slave interface manages four interfaces between the FIFOs and the fabric. Each interface can contain up to fifteen data channels. Therefore, a slave should manage read/write queues for up to sixty channels. Each channel can be programmed to be a DMA channel, or a streaming data channel. DMA channels are managed using a DMA protocol. Streaming data channels are expected to maintain their own form of flow control using the status of the Rx FIFOs (obtained using a query mechanism). Read requests to slave interfaces use one of the flow control mechanisms described previously.

Figure 9:
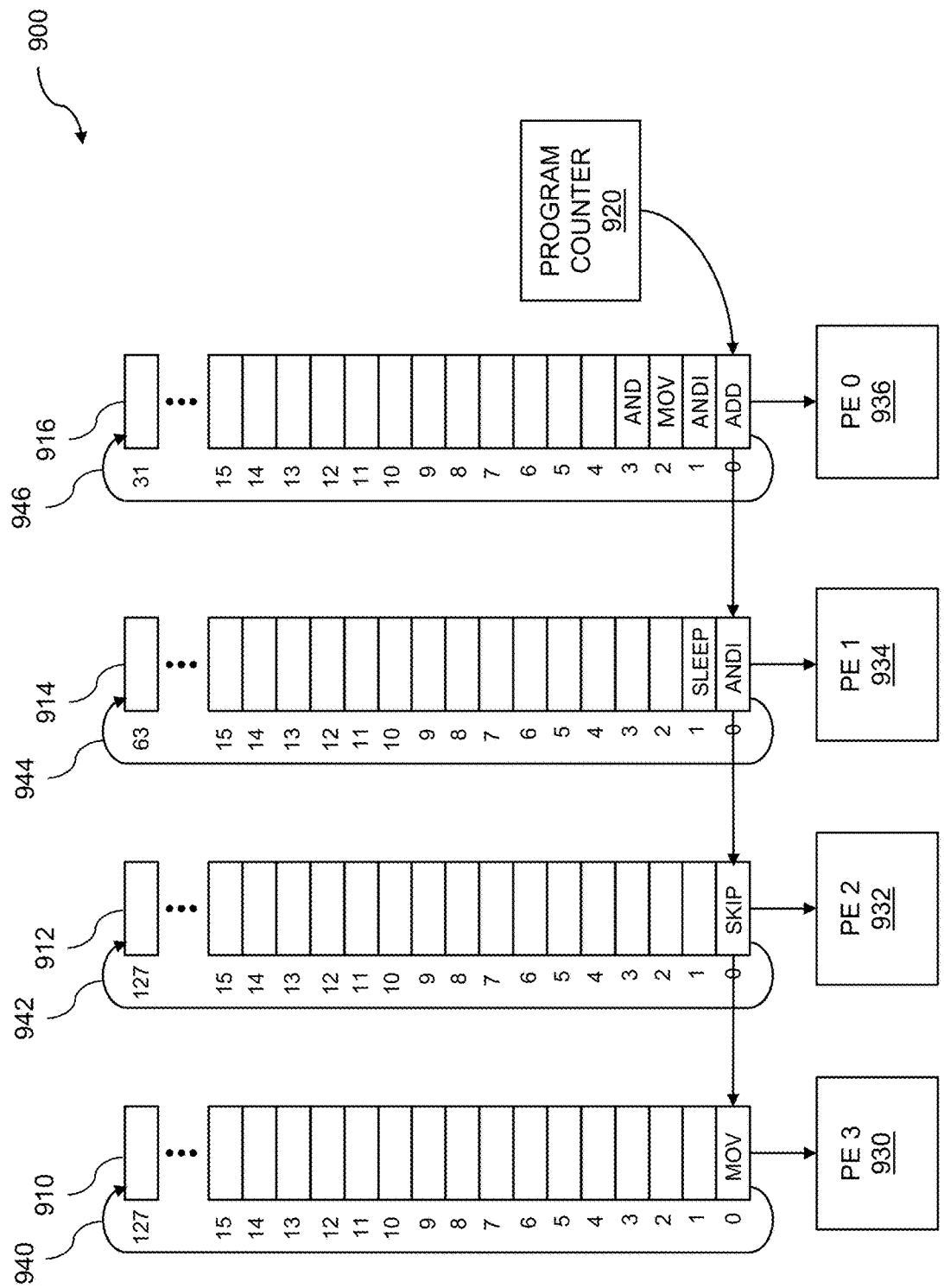
FIG. 9 shows a circular buffer and processing elements.

FIG. 9 shows a circular buffer and processing elements. A diagram 900 indicates example instruction execution for processing elements. The processing elements can include a portion of or all of the elements within a reconfigurable fabric. The instruction execution can include executing instructions for a matrix multiplication engine using pipelining. A first matrix and a second matrix are obtained for matrix multiplication within a processor. A first matrix multiply-accumulate (MAC) unit is configured within the processor, where the first MAC unit accepts input elements of the first matrix and the second matrix. A second MAC unit is configured within the processor in pipelined fashion where the second MAC unit accepts input elements of the first matrix and the second matrix. One or more additional MAC units are further configured within the processor in pipelined fashion. Multiply-accumulate operations are executed in pipelined fashion on each of the n MAC units.

A circular buffer 910 feeds a processing element 930. A second circular buffer 912 feeds another processing element 932. A third circular buffer 914 feeds another processing element 934. A fourth circular buffer 916 feeds another processing element 936. The four processing elements 930, 932, 934, and 936 can represent a quad of processing elements. In embodiments, the processing elements 930, 932, 934, and 936 are controlled by instructions received from the circular buffers 910, 912, 914, and 916. The circular buffers can be implemented using feedback paths 940, 942, 944, and 946, respectively. In embodiments, the circular buffer can control the passing of data to a quad of processing elements through switching elements, where each of the quad of processing elements is controlled by four other circular buffers (as shown in the circular buffers 910, 912, 914, and 916) and where data is passed back through the switching elements from the quad of processing elements where the switching elements are again controlled by the main circular buffer. In embodiments, a program counter 920 is configured to point to the current instruction within a circular buffer. In embodiments with a configured program counter, the contents of the circular buffer are not shifted or copied to new locations on each instruction cycle. Rather, the program counter 920 is incremented in each cycle to point to a new location in the circular buffer. The circular buffers 910, 912, 914, and 916 can contain instructions for the processing elements. The instructions can include, but are not limited to, move instructions, skip instructions, logical AND instructions, logical AND-Invert (e.g. ANDI) instructions, logical OR instructions, mathematical ADD instructions, shift instructions, sleep instructions, and so on. A sleep instruction can be usefully employed in numerous situations. The sleep state can be entered by an instruction within one of the processing elements. One or more of the processing elements can be in a sleep state at any given time. In some embodiments, a "skip" can be performed on an instruction and the instruction in the circular buffer can be ignored and the corresponding operation not performed.

In some embodiments, the circular buffers 910, 912, 914, and 916 could all have the same length, for example, 128 instructions. However, in other embodiments, the plurality of circular buffers can have differing lengths. That is, the plurality of circular buffers can comprise circular buffers of differing sizes. As shown in FIG. 9, the first two circular buffers 910 and 912 have a length of 128 instructions, the third circular buffer 914 has a length of 64 instructions, and the fourth circular buffer 916 has a length of 32 instructions, but other circular buffer lengths are also possible. The plurality of circular buffers that have differing lengths can resynchronize with a zeroth pipeline stage for each of the plurality of circular buffers. The circular buffers of differing sizes can restart at a same time step. In other embodiments, the plurality of circular buffers includes a first circular buffer repeating at one frequency and a second circular buffer repeating at a second frequency. In this situation, the first circular buffer is of one length. When the first circular buffer finishes through a loop, it can restart operation at the beginning, even though the second, longer circular buffer has not yet completed its operations. When the second circular buffer reaches completion of its loop of operations, the second circular buffer can restart operations from its beginning.

As can be seen in FIG. 9, different circular buffers can have different instruction sets within them. For example, the first circular buffer 910 contains a MOV instruction. The second circular buffer 912 contains a SKIP instruction. The third circular buffer 914 contains a SLEEP instruction and an ANDI instruction. The fourth circular buffer 916 contains an AND instruction, a MOVE instruction, an ANDI instruction, and an ADD instruction. The operations performed by the processing elements 930, 932, 934, and 936 are dynamic and can change over time, based on the instructions loaded into the respective circular buffers. As the circular buffers rotate, new instructions can be executed by the respective processing element.

Figure 10:
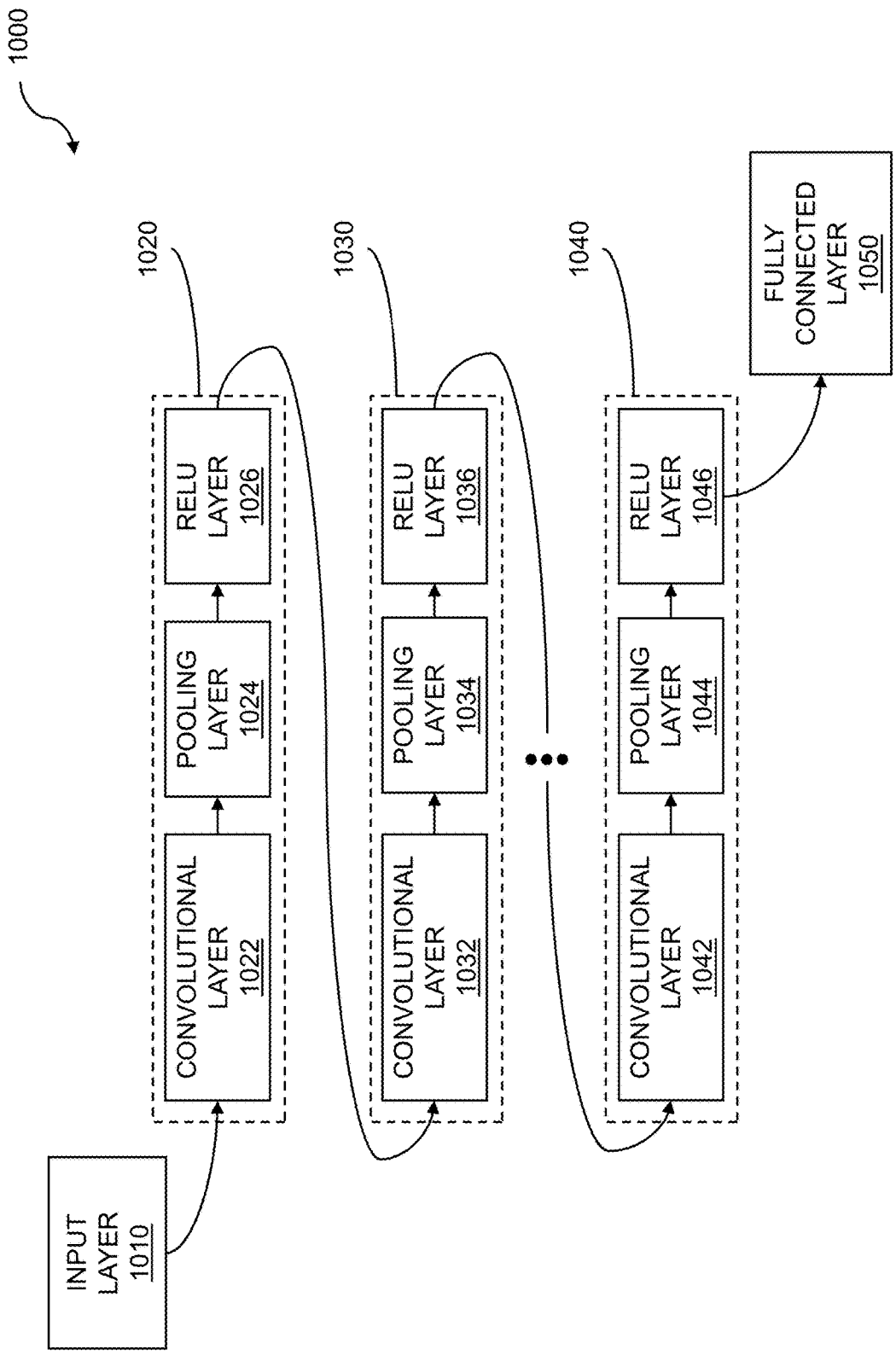
FIG. 10 illustrates a deep learning block diagram.

FIG. 10 illustrates a deep learning block diagram. The deep learning block diagram 1000 can include a neural network such as a deep neural network (DNN), a convolutional neural network (CNN), a recurrent neural network (RNN), and so on. A convolutional neural network or other neural network can be based on layers, where the layers can include input layers, output layers, fully connected layers, convolutional layers, pooling layers, max pooling layers, rectified linear unit (ReLU) layers, and so on. The layers can include machine learned layers for data manipulation. The layers can include layers within a matrix multiplication engine using pipelining. A network such as a neural network can be configured within a reconfigurable fabric. The reconfigurable fabric can include processing elements, switching elements, storage elements, etc. The reconfigurable fabric can be used to perform various operations such as logical operations, matrix operations, tensor operations, etc. A first matrix with dimensions m×k and a second matrix with dimensions k×n are obtained for matrix multiplication within a processor. A first matrix multiply-accumulate (MAC) unit is configured within the processor, wherein the first MAC unit accepts input elements of the first matrix and the second matrix, where a first element of the first matrix and a first element of the second matrix are presented to the first MAC unit on a first cycle. A second MAC unit is configured within the processor in pipelined fashion where the second MAC unit accepts input elements of the first matrix and the second matrix, where the first element of the first matrix and a second element of the second matrix are presented to the second MAC unit on a second cycle, and where a second element of the first matrix and the first element of the second matrix are presented to the first MAC unit on the second cycle. One or more additional MAC units are further configured within the processor in pipelined fashion such that a total of n MAC units are configured, where an $i_{th}$ MAC unit accepts input elements of the first matrix and the second matrix, where i is an integer in the range (3≤i≤n), where the first element of the first matrix and an $i_{th}$ element of the second matrix are presented to the $i_{th}$ MAC unit on an $(i+2)_{th}$ cycle. Multiply-accumulate operations are executed in pipelined fashion on each of the n MAC units for a total of (m×k) cycles, where additional m elements from the first matrix are presented over additional k sets of m cycles. The results of the matrix multiplication are output to a storage element, where the outputting takes additional (m×k) cycles.

The deep learning block diagram 1000 can include various layers, where the layers can include an input layer, hidden layers, a fully connected layer, and so on. In some embodiments, the deep learning block diagram can include a classification layer. The input layer 1010 can receive input data, where the input data can include a first obtained data group, a second obtained data group, a third obtained data group, a fourth obtained data group, etc. The obtaining of the data groups can be performed in a first locality, a second locality, a third locality, a fourth locality, and so on, respectively. The input layer can then perform processing such as partitioning obtained data into non-overlapping partitions. The deep learning block diagram 1000, which can represent a network such as a convolutional neural network, can contain a plurality of hidden layers. While three hidden layers, hidden layer 1020, hidden layer 1030, and hidden layer 1040 are shown, other numbers of hidden layers may be present. Each hidden layer can include layers that perform various operations, where the various layers can include a convolutional layer, a pooling layer, and a rectifier layer such as a rectified linear unit (ReLU) layer. Thus, layer 1020 can include convolutional layer 1022, pooling layer 1024, and ReLU layer 1026; layer 1030 can include convolutional layer 1032, pooling layer 1034, and ReLU layer 1036; and layer 1040 can include convolutional layer 1042, pooling layer 1044, and ReLU layer 1046. The convolutional layers 1022, 1032, and 1042 can perform convolution operations; the pooling layers 1024, 1034, and 1044 can perform pooling operations, including max pooling, such as data down-sampling; and the ReLU layers 1026, 1036, and 1046 can perform rectification operations. A convolutional layer can reduce the amount of data feeding into a fully connected layer. The deep learning block diagram 1000 can include a fully connected layer 1050. The fully connected layer can be connected to each data point from the one or more convolutional layers.

Data flow processors can be implemented within a reconfigurable fabric. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs configured in arrangements such as quads can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the cluster enters the configuration mode, various techniques, including direct memory access (DMA) can be used to load instructions from the kernel into instruction memories of the PEs. The clusters that were preprogrammed into configuration mode can be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as machine learning techniques based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

Figure 11:
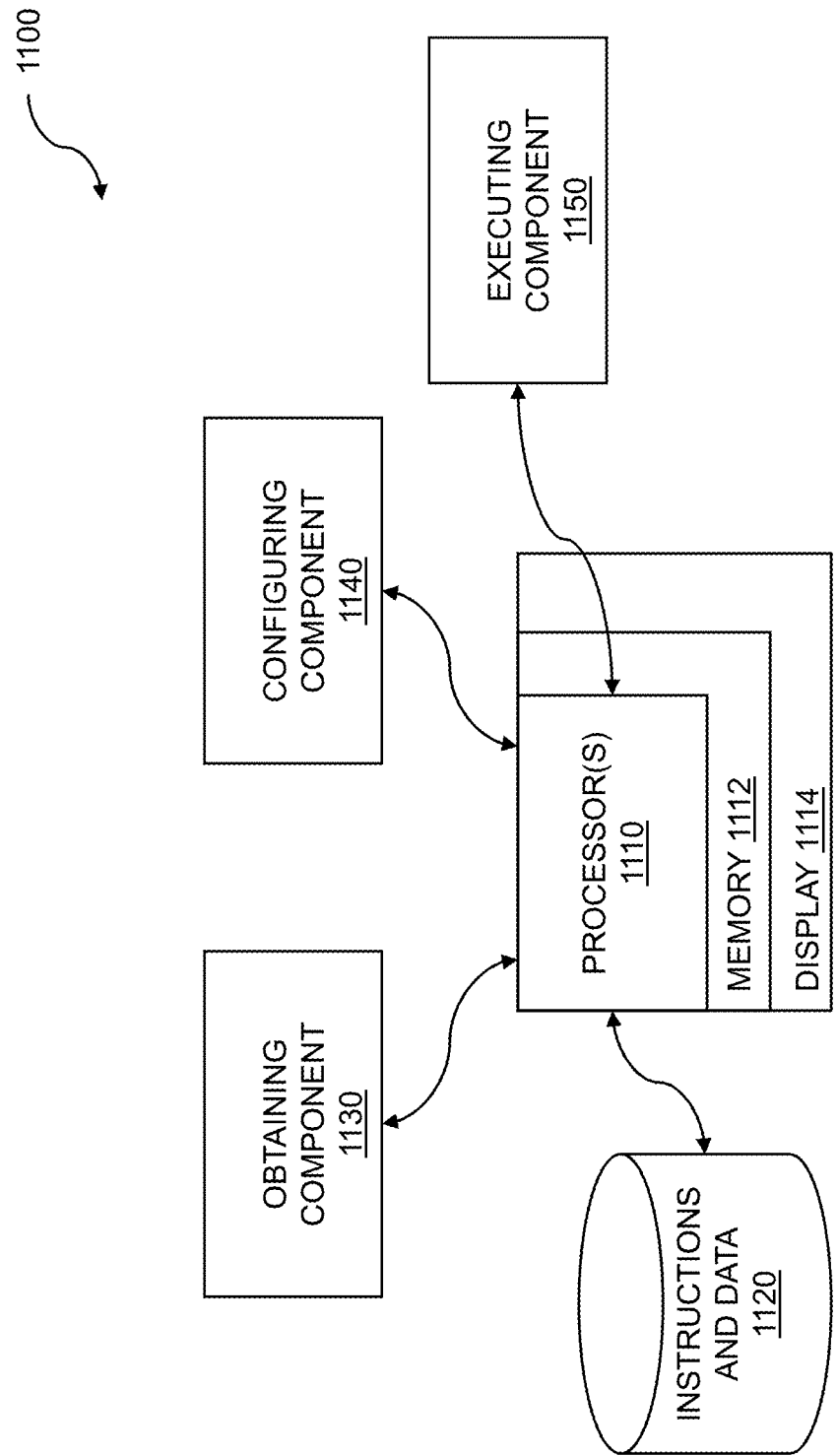
FIG. 11 is a system diagram for data manipulation.

FIG. 11 is a system diagram for data manipulation. Data manipulation is based on a matrix multiplication engine that uses pipelining. The system 1100 can include one or more processors 1110 coupled to a memory 1112 which stores instructions. The system 1100 can include a display 1114 coupled to the one or more processors 1110 for displaying data, intermediate steps, instructions, tensors, and so on. In embodiments, one or more processors 1110 are coupled to the memory 1112 where the one or more processors, when executing the instructions which are stored, are configured to: obtain a first matrix with dimensions m×k and a second matrix with dimensions k×n for matrix multiplication within a processor; configure a first matrix multiply-accumulate (MAC) unit within the processor, wherein the first MAC unit accepts input elements of the first matrix and the second matrix, and wherein a first element of the first matrix and a first element of the second matrix are presented to the first MAC unit on a first cycle; configure a second MAC unit within the processor in pipelined fashion, wherein the second MAC unit accepts input elements of the first matrix and the second matrix, wherein the first element of the first matrix and a second element of the second matrix are presented to the second MAC unit on a second cycle, and wherein a second element of the first matrix and the first element of the second matrix are presented to the first MAC unit on the second cycle; further configure one or more additional MAC units within the processor in pipelined fashion; and execute multiply-accumulate operations in pipelined fashion. Some embodiments further configure one or more additional MAC units within the processor in pipelined fashion such that a total of n MAC units are configured, wherein an $i_{th}$ MAC unit accepts input elements of the first matrix and the second matrix, wherein i is an integer in the range (3≤i≤n), and wherein the first element of the first matrix and an $i_{th}$ element of the second matrix are presented to the $i_{th}$ MAC unit on an $(i+2)_{th}$ cycle. Some embodiments execute multiply-accumulate operations in pipelined fashion on each of the n MAC units for a total of (m×k) cycles, wherein an additional m elements from the first matrix are presented over an additional k sets of m cycles.

The system 1100 can include a collection of instructions and data 1120. The instructions and data 1120 may be stored in storage such as electronic storage coupled to the one or more processors, a database, one or more statically linked libraries, one or more dynamically linked libraries, precompiled headers, source code, flow graphs, kernels, or other suitable formats. The instructions can include instructions for one or more tensor calculations. In embodiments, the tensor calculation can include a tensor convolution function, a tensor max pooling function, and the like. The tensor calculation can be performed within a reconfigurable fabric. The instructions can include satisfiability solver techniques, machine learning or deep learning techniques, neural network techniques, agents, and the like. The instructions can include constraints, routing maps, or satisfiability models.

The system 1100 can include an obtaining component 1130. The obtaining component 1130 can include functions and instructions for obtaining a first matrix with dimensions m×k and a second matrix with dimensions k×n for matrix multiplication within a processor. The processor can include a standalone processor such as a CPU or GPU, can be configured within a reconfigurable fabric, and so on. The reconfigurable fabric comprises elements, where the elements can include processing elements, storage elements, or switching elements. The processor can be coupled to a memory subsystem. As discussed throughout, the first matrix and the second matrix can include tensors. Multiplication of the first matrix and the second matrix can be based on pipelining, graphs, agents, and so on. In embodiments, wherein the processor and memory subsystem can be used to implement a data flow graph. Other types of graphs and nets can be implemented such as Petri nets, neural networks, and the like. In embodiments, the data flow graph can implement machine learning, deep learning, etc. The data flow graph can be partitioned, where the partitions of the data flow graph can include subgraphs, kernels, agents, and the like. In embodiments, the machine learning can utilize one or more neural networks, where the neural networks can include convolutional neural networks, recurrent neural networks, or other neural networks.

The system 1100 can include a configuring component 1140. The configuring component 1140 can include functions and instructions for configuring a first matrix multiply-accumulate (MAC) unit within the processor, where the first MAC unit accepts input elements of the first matrix and the second matrix, where a first element of the first matrix and a first element of the second matrix are presented to the first MAC unit on a first cycle. A multiply-accumulate unit accomplishes tasks including multiplication and keeping a running total of partial products by adding a partial product to a sum of prior partial products. The MAC can be implemented using a variety of techniques. In embodiments, a processor and memory subsystem can be allocated as part of one or more clusters within a reconfigurable fabric to implement MAC units. The configuring component 1140 also can include functions and instructions for configuring a second MAC unit within the processor in pipelined fashion where the second MAC unit accepts input elements of the first matrix and the second matrix, where the first element of the first matrix and a second element of the second matrix are presented to the second MAC unit on a second cycle, and where a second element of the first matrix and the first element of the second matrix are presented to the first MAC unit on the second cycle. The input elements from the matrices can be stored in storage elements, memory, and the like. Embodiments can include pipelining input elements to the MAC units through two input registers. The configuring component 1140 can include functions and instructions for further configuring one or more additional MAC units within the processor in pipelined fashion such that a total of n MAC units are configured, where an $i_{th}$ MAC unit accepts input elements of the first matrix and the second matrix, where i is an integer in the range (3≤i≤n), where the first element of the first matrix and an $i_{th}$ element of the second matrix are presented to the $i_{th}$ MAC unit on an $(i+2)_{th}$ cycle.

The system 1100 can include an executing component 1150. The executing component 1150 can include functions and instructions for executing multiply-accumulate operations in pipelined fashion on each of the n MAC units for a total of (m×k) cycles, where additional m elements from the first matrix are presented over additional k sets of m cycles. The results of the executing can be stored in storage elements, registers, register files, memory, and the like. Further embodiments include outputting the results of the matrix multiplication to a storage element, where the outputting takes an additional (m×k) cycles. Execution by the executing component need not be limited to multiply-accumulate operations performed on the first matrix and the second matrix. Further embodiments include presenting a first element from a third matrix and a first element from a fourth matrix to the first MAC unit after (m×k) cycles. Multiply-accumulate operations can be performed on the third matrix and the fourth matrix without having to reconfigure the multiply-accumulate units when the dimensions of the third matrix and the fourth matrix are substantially similar to the dimensions of the first matrix and the second matrix. Substantial similarity of the dimensions of the matrices can include submatrices.

The system 1100 can include a computer program product embodied in a non-transitory computer readable medium for data manipulation, the computer program product comprising code which causes one or more processors to perform operations of: obtaining a first matrix with dimensions m×k and a second matrix with dimensions k×n for matrix multiplication within a processor; configuring a first matrix multiply-accumulate (MAC) unit within the processor, wherein the first MAC unit accepts input elements of the first matrix and the second matrix, and wherein a first element of the first matrix and a first element of the second matrix are presented to the first MAC unit on a first cycle; configuring a second MAC unit within the processor in pipelined fashion, wherein the second MAC unit accepts input elements of the first matrix and the second matrix, wherein the first element of the first matrix and a second element of the second matrix are presented to the second MAC unit on a second cycle, and wherein a second element of the first matrix and the first element of the second matrix are presented to the first MAC unit on the second cycle; further configuring one or more additional MAC units within the processor in pipelined fashion; and executing multiply-accumulate operations in pipelined fashion.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer- or processor-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer- or processor-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for data manipulation comprising:
    obtaining a first matrix with dimensions m×k and a second matrix with dimensions k×n for matrix multiplication within a processor;
    configuring a first matrix multiply-accumulate (MAC) unit within the processor, wherein the first MAC unit accepts input elements of the first matrix and the second matrix, and wherein a first element of the first matrix and a first element of the second matrix are presented to the first MAC unit on a first cycle;
    configuring a second MAC unit within the processor in pipelined fashion, wherein the second MAC unit accepts input elements of the first matrix and the second matrix, wherein the first element of the first matrix and a second element of the second matrix are presented to the second MAC unit on a second cycle, and wherein a second element of the first matrix and the first element of the second matrix are presented to the first MAC unit on the second cycle;
    further configuring one or more additional MAC units within the processor in pipelined fashion; and
    executing multiply-accumulate operations in pipelined fashion.

2. The method of claim 1 wherein the configuring is accomplished such that a total of n MAC units are configured, wherein an $i_{th}$ MAC unit accepts input elements of the first matrix and the second matrix, wherein i is an integer in a range of ($3 \leq i \leq n$), and wherein the first element of the first matrix and an $i_{th}$ element of the second matrix are presented to the $i_{th}$ MAC unit on an $(i+2)^{th}$ cycle.

3. The method of claim 2 wherein the executing includes executing multiply-accumulate operations in pipelined fashion on each of the n MAC units for a total of (m×k) cycles, wherein additional m elements from the first matrix are presented over additional k sets of m cycles.

4. The method of claim 1 wherein the executing is accomplished using time-division multiplexing.

5. The method of claim 1 further comprising outputting results of the matrix multiplication to a storage element, wherein the outputting takes an additional (m×k) cycle.

6. The method of claim 1 further comprising presenting a first element from a third matrix and a first element from a fourth matrix to the first MAC unit after (m×k) cycles.

7. The method of claim 6 wherein a second dimension of the fourth matrix is the same as a second dimension of the second matrix.

8. The method of claim 1 wherein the matrices comprise subsections of an o-dimensional tensor, wherein o is greater than 2.

9. The method of claim 1 wherein each MAC unit is configured to have an accumulator depth of m.

10. The method of claim 1 wherein each matrix multiply inner product takes k cycles to complete.

11. The method of claim 1 further comprising pipelining input elements to the MAC units through two input registers.

12. The method of claim 1 wherein the input elements of the first matrix comprise an 8×8 submatrix.

13. The method of claim 12 wherein the input elements of the second matrix comprise an 8×8 submatrix.

14. The method of claim 1 wherein performing n MAC operations in parallel reduces an amount of time taken to perform the n MAC operations from an order of magnitude of $n^3$ to an order of magnitude of $n^2$.

15. The method of claim 1 further comprising adding one or more idle or no operation (NOP) cycles after completion of a matrix multiply operation before starting a next matrix multiply operation.

16. The method of claim 15 wherein the number of idle or NOP cycles is no less than (m×n)−(m×(k−1))−n.

17. The method of claim 15 wherein the adding idle or NOP cycles facilitates pipeline draining.

18. The method of claim 15 wherein the idle or NOP cycles are interpreted when neither an input element of the first matrix nor an input element of the second matrix is valid during a same cycle.

19. The method of claim 1 wherein the MAC units are used to implement a data flow graph.

20. The method of claim 1 wherein the input elements of the first matrix are taken from a row of the first matrix.

21. The method of claim 1 wherein the input elements of the second matrix are taken from a column of the second matrix.

22. A computer program product embodied in a non-transitory computer readable medium for data manipulation, the computer program product comprising code which causes one or more processors to perform operations of:
    obtaining a first matrix with dimensions m×k and a second matrix with dimensions k×n for matrix multiplication within a processor;
    configuring a first matrix multiply-accumulate (MAC) unit within the processor, wherein the first MAC unit accepts input elements of the first matrix and the second matrix, and wherein a first element of the first matrix and a first element of the second matrix are presented to the first MAC unit on a first cycle;
    configuring a second MAC unit within the processor in pipelined fashion, wherein the second MAC unit accepts input elements of the first matrix and the second matrix, wherein the first element of the first matrix and a second element of the second matrix are presented to the second MAC unit on a second cycle, and wherein a second element of the first matrix and the first element of the second matrix are presented to the first MAC unit on the second cycle;
    further configuring one or more additional MAC units within the processor in pipelined fashion; and
    executing multiply-accumulate operations in pipelined fashion.

23. A computer system for data manipulation comprising:
    a memory which stores instructions;
    one or more processors coupled to the memory wherein the one or more processors, when executing the instructions which are stored, are configured to:

obtain a first matrix with dimensions m×k and a second matrix with dimensions k×n for matrix multiplication within a processor;

configure a first matrix multiply-accumulate (MAC) unit within the processor, wherein the first MAC unit accepts input elements of the first matrix and the second matrix, and wherein a first element of the first matrix and a first element of the second matrix are presented to the first MAC unit on a first cycle;

configure a second MAC unit within the processor in pipelined fashion, wherein the second MAC unit accepts input elements of the first matrix and the second matrix, wherein the first element of the first matrix and a second element of the second matrix are presented to the second MAC unit on a second cycle, and wherein a second element of the first matrix and the first element of the second matrix are presented to the first MAC unit on the second cycle;

further configure one or more additional MAC units within the processor in pipelined fashion; and execute multiply-accumulate operations in pipelined fashion.

\* \* \* \* \*